(12) United States Patent
Ma et al.

(10) Patent No.: US 12,461,628 B2
(45) Date of Patent: Nov. 4, 2025

(54) LIQUID CRYSTAL WRITING BOARD AND METHOD FOR REPAIRING THE SAME

(71) Applicants: Hefei Xinsheng Optoelectronics Technology Co., Ltd., Anhui (CN); BOE Technology Group Co., Ltd., Beijing (CN)

(72) Inventors: Xiaoye Ma, Beijing (CN); Ruifang Du, Beijing (CN); Haijiao Qian, Beijing (CN); Huanhuan Huang, Beijing (CN); Chengshao Yang, Beijing (CN); Ran Zhang, Beijing (CN)

(73) Assignees: Hefei Xinsheng Optoelectronics Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/687,099

(22) PCT Filed: Dec. 19, 2022

(86) PCT No.: PCT/CN2022/139854
§ 371 (c)(1),
(2) Date: Feb. 27, 2024

(87) PCT Pub. No.: WO2024/130463
PCT Pub. Date: Jun. 27, 2024

(65) Prior Publication Data
US 2025/0123712 A1    Apr. 17, 2025

(51) Int. Cl.
*G02F 1/13* (2006.01)
*G02F 1/1333* (2006.01)
(Continued)

(52) U.S. Cl.
CPC .......... *G06F 3/0418* (2013.01); *G02F 1/1309* (2013.01); *G02F 1/13338* (2013.01);
(Continued)

(58) Field of Classification Search
CPC .. G06F 3/0418; G02F 1/1309; G02F 1/13338; G02F 1/13454; G02F 1/136286; G02F 1/1368
See application file for complete search history.

(56) References Cited

U.S. PATENT DOCUMENTS

2019/0317348 A1* 10/2019 Marhefka ............. G02F 1/1334
2019/0369785 A1* 12/2019 Chen .................... G06F 3/0445
2020/0160799 A1* 5/2020 Yoshida ............... G09G 3/3648

* cited by examiner

*Primary Examiner* — Donald L Raleigh
(74) *Attorney, Agent, or Firm* — WHDA, LLP

(57) ABSTRACT

The present disclosure provides a liquid crystal writing board and a method for repairing the same. The liquid crystal writing board includes a first substrate, a second substrate, and a bistable liquid crystal layer disposed between the first substrate and the second substrate. The first substrate includes a plurality of first signal line groups, the first signal line group including at least two first signal lines; a plurality of second signal lines, the first signal lines and the second signal lines intersecting with each other; and a control electrode disposed in an area surrounded by two adjacent first signal lines and two adjacent second signal lines, the first signal lines and the second signal lines being configured to jointly provide control signals to the control electrode. The first signal lines in the first signal line group are electrically connected with each other.

17 Claims, 9 Drawing Sheets

(51) Int. Cl.
*G02F 1/1345* (2006.01)
*G02F 1/1362* (2006.01)
*G02F 1/1368* (2006.01)
*G06F 3/041* (2006.01)

(52) U.S. Cl.
CPC .... *G02F 1/13454* (2013.01); *G02F 1/136286* (2013.01); *G02F 1/1368* (2013.01); *G02F 2202/22* (2013.01)

LIQUID CRYSTAL WRITING BOARD AND METHOD FOR REPAIRING THE SAME

TECHNICAL FIELD

The present disclosure relates to the field of display technology, and in particular to a liquid crystal writing board and a repair method thereof.

BACKGROUND

The liquid crystal writing board has a broad application prospect in the education market due to its' advantages such as eye protection, dust-free and convenience. A user applies a certain pressure to the liquid crystal writing board during writing, and the pressure enables liquid crystal molecules in the liquid crystal writing board to deflect to present different colors, so that the liquid crystal writing board is enabled to display handwritings. When the user needs to erase written contents on the liquid crystal writing board, a voltage is usually applied to the liquid crystal writing board to generate an electric field, and liquid crystal molecules in the liquid crystal writing board are deflected in the electric field and return to an ordered state, thereby eliminating the handwritings on the writing board.

In the related art, when a local trace in the liquid crystal writing board is abnormal, the handwriting in the area cannot be erased and is difficult to restore. As a result, the local area of the liquid crystal writing board cannot be used, and the user experience is reduced.

SUMMARY

Embodiments of the present disclosure adopt technical solutions described below.

In a first aspect, an embodiment of the present disclosure provides a liquid crystal writing board, including a first substrate, a second substrate, and a bistable liquid crystal layer disposed between the first substrate and the second substrate.

The first substrate includes:
a plurality of first signal line groups, the first signal line groups each including at least two first signal lines;
a plurality of second signal lines, the second signal lines and the first signal lines intersecting with each other; and
a control electrode disposed in an area surrounded by two adjacent first signal lines and two adjacent second signal lines, the first signal lines and the second signal lines being configured to jointly provide a control signal to the control electrode,
the first signal lines in each first signal line group are electrically connected with each other.

In some embodiments of the present disclosure, the liquid crystal writing board includes a display area and a peripheral area surrounding the display area, and the peripheral area includes a first peripheral sub-area and a second peripheral sub-area arranged opposite to each other;
each first signal line includes a first end portion, a second end portion, and a conductor segment between the first end portion and the second end portion, the first end portion being located at the first peripheral sub-area, the second end portion being located at the second peripheral sub-area, and the conductor segment being located at the display area;
the first end portions of the first signal lines in each first signal line group are electrically connected with each other; and/or
the second end portions of the first signal lines in each first signal line group are electrically connected with each other.

In some embodiments of the present disclosure, the liquid crystal writing board includes a first driver, and the first end portions of the first signal lines are all electrically connected to the first driver.

In some embodiments of the present disclosure, the first substrate further includes a plurality of second signal line groups, the second signal line groups each includes at least two second signal lines, and the second signal lines in each second signal line group are electrically connected with each other;
the peripheral area further includes a third peripheral sub-area and a fourth peripheral sub-area arranged opposite to each other, and the third peripheral sub-area is arranged adjacent to the first peripheral sub-area;
each second signal line includes a first end portion, a second end portion, and a conductor segment between the first end portion and the second end portion, the first end portion being located at the third peripheral sub-area, the second end portion being located at the fourth peripheral sub-area, and the conductor segment being located at the display area;
the first end portions of the second signal lines in each second signal line group are electrically connected with each other; and/or
the second end portions of the second signal lines in each second signal line group are electrically connected with each other.

In some embodiments of the present disclosure, the liquid crystal writing board includes a second driver, and the first end portions of the second signal lines are all electrically connected to the second driver.

In some embodiments of the present disclosure, the first substrate includes:
a first underlayment;
a first conducting layer disposed on a side of the first underlayment close to the second substrate, the first conducting layer includes the plurality of second signal line groups;
a second conducting layer disposed on a side of the first conducting layer facing away from the first underlayment, the second conducting layer includes the plurality of first signal line groups; and
a third conducting layer disposed on a side of the second conducting layer facing away from the first underlayment, the third conducting layer includes the control electrode, a plurality of first connection portions, and a plurality of second connection portions,
the control electrode, the first connection portions, and the second connection portions are disposed on a same layer;
a first insulation layer is disposed between the first conducting layer and the second conducting layer, and a second insulation layer is disposed between the second conducting layer and the third conducting layer;
when the first end portions in a same signal line group are electrically connected with each other, the first end portions in the same signal line group are electrically connected with each other through at least one of the first connection portions; when the second end portions in a same signal line group are electrically connected with each other, the second end portions in the same signal line group are electrically connected with each other through at least one of the second connection portions; the signal line group comprises at least one of the first signal line groups and the second signal line groups.

In some embodiments of the present disclosure, the first end portions in the same signal line group are electrically connected with each other through one of the first connection portions, and an orthographic projection of each of the first end portions in the same signal line group on the first underlayment overlaps with an orthographic projection of the first connection portion on the first underlayment; and the second end portions in the same signal line group are electrically connected with each other through one of the second connection portions, and an orthographic projection of each of the second end portions in the same signal line group on the first underlayment overlaps with an orthographic projection of the second connection portion on the first underlayment.

In some embodiments of the present disclosure, the first end portion includes a first line segment and a second line segment, and the first line segment is connected to the conductor segment and the second line segment; an extension direction of the first line segment is the same as extension direction of the conductor segment, and the extension direction of the second line segment intersects with the extension direction of the conductor segment;

the liquid crystal writing board includes a plurality of first shunt connection lines and a plurality of leads that are electrically connected; the extension direction of the first shunt connection line is the same as the extension direction of the second line segment; a number of the first shunt connection lines is the same as the number of the signal line groups corresponding to the first shunt connection lines; and the second line segments in the same signal line group are indirectly electrically connected to the same first shunt connection line;

the first end portion is at least one of the first end portion of the first signal line and the first end portion of the second signal line.

In some embodiments of the present disclosure, the second line segments in the same signal line group are electrically connected with each other through multiple first connection portions; for the same signal line group, the number of the first connection portions is the same as the number of signal lines in the signal line group corresponding to the first connection portions;

an orthographic projection of the first connection portion on the first underlayment overlaps with an orthographic projection of the second line segment on the first underlayment, and the orthographic projections of the first connection portions corresponding to the same signal line group on the first underlayment overlap with the orthographic projection of the same first shunt connection line on the first underlayment.

In some embodiments of the present disclosure, the second end portion includes a first bend portion and a second bend portion that are disconnected, the first bend portion is connected to the conductor segment;

the liquid crystal writing board further includes a plurality of second shunt connection lines and a plurality of electrostatic units, an extension direction of the second shunt connection line intersects with an extension direction of the conductor segment, and the electrostatic unit is connected to the second bend portion;

the first bend portions and the second bend portions in the same first signal line group are electrically connected to the same second shunt connection line;

the second end portion is at least one of the second end portion of the first signal line and the second end portion of the second signal line.

In some embodiments of the present disclosure, the second end portions in the same signal line group are electrically connected with each other through multiple second connection portions; for the same signal line group, the number of the second connection portions is the same as the number of signal lines in the signal line group corresponding to the second connection portions;

the first bend portions in the same signal line group are electrically connected to the same second shunt connection line through the second connection portions, and an orthographic projection of the second connection portion on the first underlayment overlaps with an orthographic projection of the first bend portion on the first underlayment and an orthographic projection of the second bend portion of the same signal line on the first underlayment; and the second bend portions in the same signal line group are electrically connected to the same second shunt connection line; orthographic projections of the second bend portions in the same signal line group on the first underlayment overlap with an orthographic projection of the same second shunt connection line on the first underlayment, or the second bend portions in the same signal line group and the second shunt connection line are of an integrated structure.

In some embodiments of the present disclosure, the first substrate further includes a plurality of transistors arranged in an array, and the control electrode is connected to a data line through the transistors; a source electrode of the transistor is electrically connected to the data line, a drain electrode of the transistor is electrically connected to the control electrode, and a gate of the transistor is electrically connected to a gate line;

the first substrate further includes a plurality of connection lines, a gap exists between an orthographic projection of the source electrode of the transistor on the first underlayment and an orthographic projection of the data line on the first underlayment, and the source electrode of the transistor is electrically connected to the data line through the connection lines.

In some embodiments of the present disclosure, the first signal line includes a data line, and the second signal line comprises a gate line; or the second signal line comprises the data line, and the first signal line comprises the gate line.

In some embodiments of the present disclosure, when the first signal line includes the data line and the second signal line includes the gate line, the first driver includes at least one data driver integrated circuit, and the second driver includes at least one gate driver or a shift register circuit arranged in cascade;

when the second signal line includes the data line, and the first signal line includes the gate line, the second driver includes at least one data driver, and the first driver includes at least one gate driver or a shift register circuit arranged in cascade.

In some embodiments of the present disclosure, the first substrate further includes a third insulation layer disposed between the third conducting layer and the bistable liquid crystal layer;

the second substrate includes a second underlayment and a fourth conducting layer disposed on the second underlayment, and the second underlayment is a flexible underlayment.

In some embodiments of the present disclosure, the number of the first signal lines comprised in the first signal line group ranges from 2 to 8; the number of the second signal lines comprised in the second signal line group ranges from 2 to 8.

In a second aspect, an embodiment of the present disclosure provides a control method of a liquid crystal writing board, applied to repairing any liquid crystal writing board described in the first aspect, the method includes:

in response to one of the first signal lines in the first signal line group being disconnected, any one of the first signal lines other than the disconnected first signal line in the first signal line group transmitting an electrical signal to the disconnected first signal line.

In a third aspect, an embodiment of the present disclosure provides a repair method of a liquid crystal writing board, applied to repairing any liquid crystal writing board described in the first aspect, the first signal line includes a data line, and the second signal line includes a gate line, the method includes:

in response to a short circuit occurred between the data line and the gate line, cutting, the data on two sides of a position where the short circuit occurred, so that the data line located between cutting positions is disconnected from the data line at two sides, and an electrical signal is transmitted to the cut data line by the data lines in the first signal line group other than the cut data line.

The above explanation is merely an overview of the technical solutions of the present disclosure. In order to know about the technical means of the present disclosure more clearly so that the solutions may be implemented according to the contents of the specification, and in order to make the above and other objects, features and advantages of the present disclosure more apparent and understandable, specific implementations of the present disclosure are set forth below.

BRIEF DESCRIPTION OF THE DRAWINGS

In order to illustrate technical solutions of the embodiments of the present disclosure or the related art more clearly, the accompanying drawings used in the illustration of the embodiments or the related art will be briefly introduced. Apparently, the accompanying drawings in the following explanation illustrate merely some embodiments of the present disclosure, and those skilled in the art may obtain other accompanying drawings based on these accompanying drawings without paying any creative effort.

DETAILED DESCRIPTION

A clear and thorough illustrating for technical solutions in the embodiments of the present disclosure will be given below in conjunction with the accompanying drawings in the embodiments of the present disclosure. Apparently, the described embodiments are merely a part of embodiments of the present disclosure, not all the embodiments. All other embodiments obtained, based on the embodiments in the present disclosure, by those skilled in the art without paying creative effort fall within the protection scope of the present disclosure.

Unless it is otherwise defined in the context, the term "comprising/including" throughout the specification and claims is interpreted in an open and inclusive sense, that is, "including, but not limited to". In the illustration of the specification, the terms "an embodiment", "some embodiments", "an exemplary embodiment", "an example", "specific examples" or "some examples" are intended to indicate that specific features, structures, materials or characteristics related to the embodiment or example are included in at least one embodiment or example of the present disclosure. Schematic representations of the above terms do not necessarily refer to the same embodiment or example. Furthermore, the particular features, structures, materials or characteristics described may be included in any suitable manner in any one or more embodiments or examples.

In addition, it should be noted that when an element or implementation thereof the present disclosure are introduced, the articles "a", "an", "the" and "said" are intended to indicate that there are one or more elements. Unless otherwise stated, "plurality" means two or more. The terms "comprising", "including", "containing" and "having" are intended to be inclusive and mean that there may be additional elements other than the listed elements. The terms "first", "second", "third", etc. are only used for descriptive purposes, and should not be construed as indicating or implying relative importance and the order of formation.

Polygons mentioned in the specification are not strictly defined, and may be approximate triangles, rectangles, trapezoids, pentagons or hexagons, etc. There may be some small deformations caused by tolerances, and there may be chamfers, rounded corners, arc edges and deformations and the like.

Figure 2:
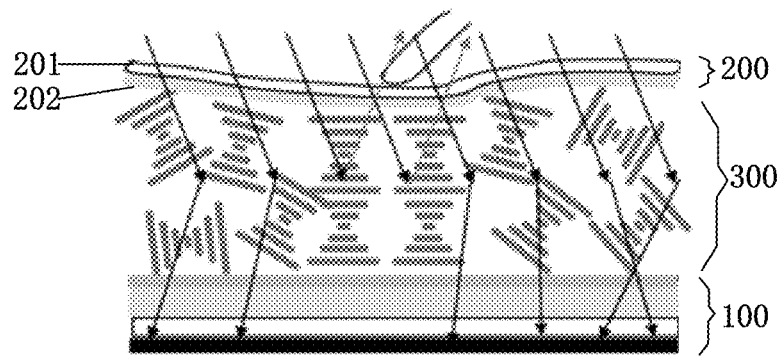
FIG. 2 is a cross-sectional structural diagram of a liquid crystal writing board provided by an embodiment of the present disclosure.
Figure 3:
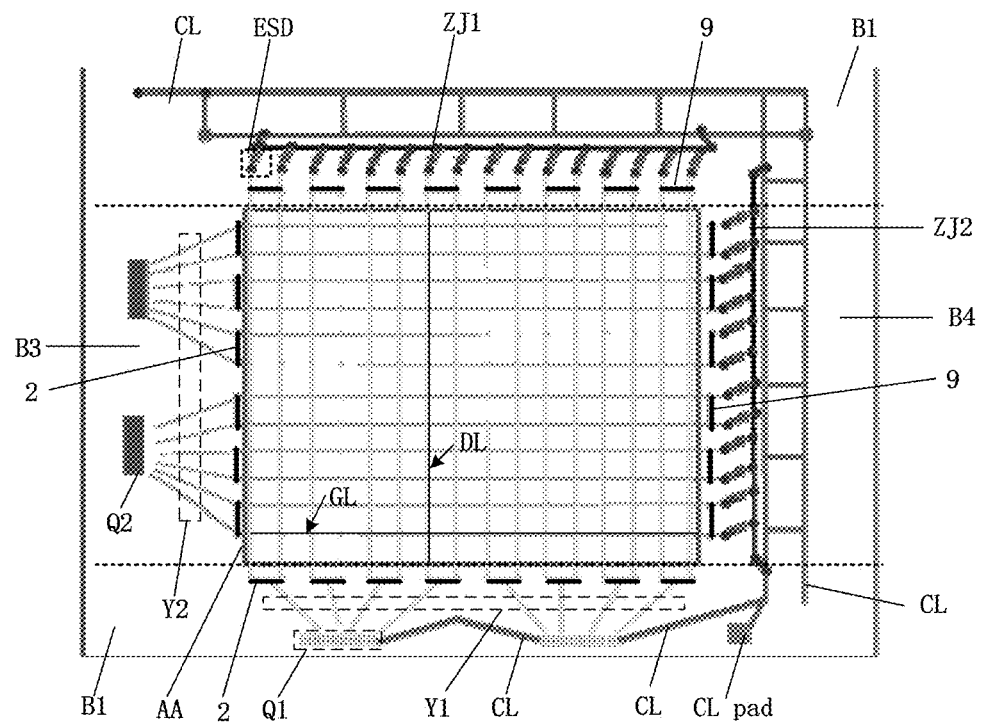
FIG. 3 is a top view of a liquid crystal writing board provided by an embodiment of the present disclosure.

An embodiment of the present disclosure provides a liquid crystal writing board. As shown in FIG. 2, the liquid crystal writing board includes a first substrate 100, a second substrate 200, and a bistable liquid crystal layer 300 disposed between the first substrate 100 and the second substrate 200. As shown in FIG. 3, the first substrate 100 includes a plurality of first signal line groups, a plurality of second signal lines and a control electrode 1.

Each first signal line group includes at least two first signal lines.

The first signal lines and the second signal lines intersect with each other.

The control electrode 1 is disposed in an area surrounded by two adjacent first signal lines and two adjacent second signal lines, and the first signal lines and the second signal lines are configured to jointly provide a control signal to the control electrode 1.

The first signal lines in the first signal line group are electrically connected with each other.

The liquid crystal writing board, as one kind of writing board, has occupied most market share in recent years due to the advantages of low power consumption and clear handwriting. The liquid crystal writing board generally includes two substrates arranged opposite to each other and a bistable liquid crystal layer disposed between the two substrates, and the bistable liquid crystal layer includes bistable liquid crystal molecules. A bistable liquid crystal molecule has a planar texture state (abbreviated as P-state), a focal conic texture state (abbreviated as FC-state), and a hometropic texture state (abbreviated as H-state). The P-state and FC-state are stable states that can be maintained without voltage, and the H-state is unstable state that is presented while voltage is continuously transmitted.

When the liquid crystal writing board is subjected to an external pressure, the bistable liquid crystal molecules in the bistable liquid crystal layer 300 turn into the P-state under the effect of the external pressure, so as to reflect light of a certain color. Accordingly, an area of the liquid crystal writing board subjected to the external pressure can display written handwritings. When it is necessary to erase the handwritings, a thin film transistor in an erasing area is controlled to turn on and a source electrode voltage is sent to the thin film transistor to charge a pixel electrode (the control electrode 1) in the erasing area, so that a voltage difference is formed between a common electrode and the pixel electrode (the control electrode 1) in the erasing area. Under the effect of the voltage difference, bistable liquid crystal molecules located in the erasing area are rearranged into the FC-state and present a scattering state, thereby reflecting the bottom color of a liquid crystal writing plate. Accordingly, the handwriting written in the erasing area disappears. Meanwhile, the pixel electrode in the non-erasing area is controlled not to be charged, and the handwriting in the non-erasing area does not change, so that a local erasure on the liquid crystal writing board is achieved.

In an exemplary embodiment, the second substrate 200 includes a second underlayment and a conductive film (fourth conducting layer 202) on the second underlayment.

Exemplarily, the second underlayment may be a flexible underlayment; the material of the flexible underlayment may include any one of polyimide (PI), polyethylene terephthalate (PET), or a surface-treated polymer flexible film, and the like.

Exemplarily, the material of the conductive film (fourth conducting layer 202) on the second underlayment includes a transparent conductive material, such as indium tin oxide (ITO), or indium zinc oxide (IZO).

Exemplarily, referring to FIG. 2, the fourth conducting layer 202 is closer to the first substrate 100 than the second underlayment 201.

In an exemplary embodiment, the first substrate 100 includes a first underlayment 101 and a driver circuit and a transistor arranged on the first underlayment 101, the driver circuit includes a plurality of signal lines, such as the first signal line and the second signal line.

Exemplarily, the first underlayment 101 may be a rigid underlayment, for example, an underlayment made from glass and silicon material.

In some embodiments, the first signal line is a data line, and the second signal line is a gate line.

In other embodiments, the first signal line is the gate line, and the second signal line is the data line; the data line intersects with the gate line.

Since the control electrode 1 is located in an area surrounded by two adjacent first signal lines and two adjacent second signal lines, it can be understood that a plurality of control electrodes 1 are arranged in an array.

In an exemplary embodiment, the material of the control electrode 1 includes a conductive transparent material.

Exemplarily, the material of the control electrode 1 may be ITO or IZO.

Exemplarily, the control electrode 1 is provided with a plurality of slits for improving the light transmittance of the liquid crystal writing board and reducing the loss of the reflected light by the control electrode 1 during reflection.

In an embodiment of the present disclosure, the first signal line and the second signal line are configured to jointly provide a control signal to the control electrode 1. When the first signal line and the second signal line jointly provide the control signal to the control electrode 1, the control electrode 1 controls the bistable liquid crystal of a corresponding area to change from a reflective state to a scattering state, and the handwriting disappears, thereby erasing the handwriting.

Figure 1:
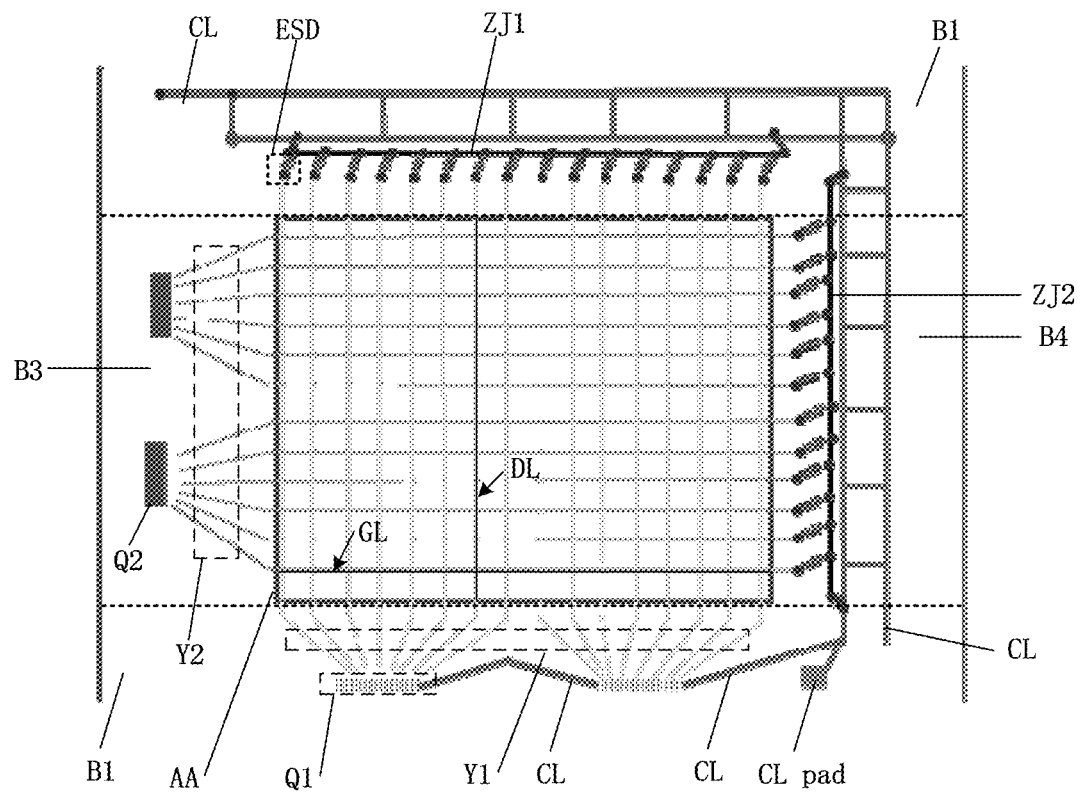
FIG. 1 is a structural diagram of a liquid crystal writing board in the related art.

In practical applications, when one of the first signal lines in the same first signal line group is broken and an open circuit occurs, compared with the liquid crystal writing board in the related art as shown in FIG. 1, the first signal lines in the first signal line group are configured to be electrically connected with each other in the liquid crystal writing board provided in the embodiments of the present disclosure, so that other first signal lines in the first signal line group can provide a control signal to the control electrode 1 together with the corresponding second signal line. Accordingly, a situation, that one row or one column of control electrodes 1 is unable to control the state of the bistable liquid crystal in the corresponding area due to the disconnected first signal line, is avoided, and the erasing function is prevented from being disabled in a local area of the liquid crystal writing board. Therefore, the product quality of the liquid crystal writing board is greatly improved.

In some embodiments of the present disclosure, as shown in FIG. 3, the liquid crystal writing board includes a display area AA and a peripheral area surrounding the display area. The peripheral area includes a first peripheral sub-area B1 and a second peripheral sub-area B2 arranged opposite to each other. The first signal line includes a first end portion, a second end portion, and a conductor segment located between the first end portion and the second end portion. The first end portion is located at the first peripheral sub-area B1, the second end portion is located at the second peripheral sub-area B2, and the conductor segment is located at the display area AA.

The first end portions of various first signal lines in the first signal line group are electrically connected with each other, and/or the second end portions of the first signal lines in the first signal line group are electrically connected with each other.

The first end portions of the first signal lines in the first signal line group being electrically connected with each other, and/or the second end portions of the first signal lines in the first signal line group being electrically connected with each other include the following cases:

For example, in a first case, the first end portions of the first signal lines in the first signal line group are electrically connected with each other.

For example, in a second case, the second end portions of the first signal lines in the first signal line group are electrically connected with each other.

For example, in a third case, the first end portions of the first signal lines in the first signal line group are electrically connected with each other, and the second end portions of the first signal lines in the first signal line group are electrically connected with each other.

Exemplarily, as shown in FIG. 3, the first signal line (for example, a data line DL) extends in a vertical direction, a conductor segment of the first signal line is located at the display area AA, the first end portion of the first signal line is located on a lower side of the display area AA (the first peripheral sub-area B1), and the second end portion of the first signal line is located on an upper side of the display area AA (the second peripheral sub-area B2).

In the embodiment of the present disclosure, the first end portions of the first signal lines in the first signal line group are electrically connected with each other, and/or the second end portions of the first signal lines in the first signal line group are electrically connected with each other. In the case that an open circuit occurs when one of the first signal lines in the same first signal line group is broken, since the first signal lines in the first signal line group are configured to be electrically connected with each other, other first signal lines in the first signal line group can provide a control signal to the control electrode 1 together with the corresponding second signal line. Accordingly, the erasing function is prevented from being disabled in a local area of the liquid crystal writing board, which is caused by one row or one column of control electrodes 1 being unable to control the state of the bistable liquid crystal in the corresponding area. Therefore, the product quality of the liquid crystal writing board is greatly improved.

Figure 17:
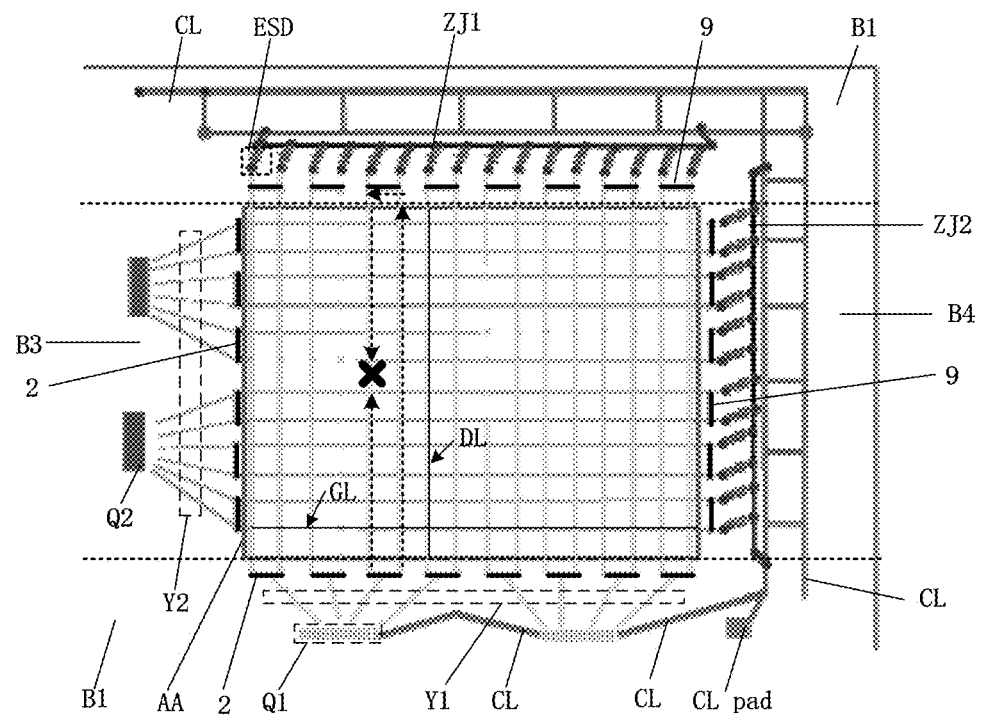
FIG. 17 and FIG. 18 are diagrams illustrating two repair methods of a liquid crystal writing board provided by an embodiment of the present disclosure.

Hereinafter, the liquid crystal writing board as shown in FIG. 17 is taken as an example to describe the use effect of the liquid crystal writing board provided by the embodiments of the present disclosure in the case of an open circuit.

As shown in FIG. 17, the first end portions of the first signal lines in the first signal line group are electrically connected with each other, and the second end portions of the first signal lines in the first signal line group are electrically connected with each other. For example, the first signal line is the DL, when one DL in one data line group is broken (at the position marked by x), another DL in the same data line group can transmit an electrical signal to the broken DL along a direction indicated by the dotted arrow so that the DL and a GL can still jointly provide a control signal to the control electrode 1. Therefore, it is ensured that the erasing function in a local area (an area where the position marked by x is located) of the liquid crystal writing board is not affected, thereby improving the quality of the liquid crystal writing board.

In some embodiments of the present disclosure, as shown in FIG. 3, the liquid crystal writing board includes a first driver Q1, and the first end portion of each first signal line is electrically connected with the first driver Q1. In FIG. 3, the first signal line is drawn as the DL. The configuration of the first driver Q1 is not limited herein.

By way of example, in the case where the first signal line is the DL, the first driver Q1 may be a data signal driver integrated circuit (IC), such as a display driver IC (DDIC). As another example, the first driver Q1 may be a touch and display driver integration (TDDI) IC.

In some embodiments of the present disclosure, the first substrate 100 further includes a plurality of second signal line groups, and each second signal line group includes at least two second signal lines. The second signal lines in the second signal line groups are electrically connected with each other. As shown in FIG. 3, the peripheral area further includes a third peripheral sub-area B3 and a fourth peripheral sub-area B4 arranged opposite to each other. The third peripheral sub-area B3 is arranged adjacent to the first peripheral sub-area B1. The second signal line includes a first end portion, a second end portion, and a conductor segment located between the first end portion and the second end portion. The first end portion is located in the third peripheral sub-area B3, the second end portion is located in the fourth peripheral sub-area B4, and the conductor segment is located in the display area AA. The first end portions of the second signal lines in the second signal line group are electrically connected with each other; and/or the second end portions of the second signal lines in the second signal line group are electrically connected with each other.

The first end portions of the second signal lines in the second signal line group being electrically connected with each other, and/or second end portions of the second signal lines in the second signal line group being electrically connected with each other, includes the following cases:

For example, in a first case, the first end portions of the second signal lines in the second signal line group are electrically connected with each other.

For example, in a second case, the second end portions of the second signal lines in the second signal line group are electrically connected with each other.

For example, in a third case, the first end portions of the second signal lines in the second signal line group are electrically connected with each other, and second end portions of the second signal lines in the second signal line group are electrically connected with each other.

Exemplarily, as shown in FIG. 3, the second signal line (for example a gate line GL) extends in a horizontal direction, the conductor segment of the second signal line is located in the display area AA, the first end portion of the second signal line is located on the left side of the display area AA (the third peripheral sub-area B3), and the second end portion of the second signal line is located on the right side of the display area AA (the fourth peripheral sub-area B4). The second signal line is drawn as a GL in FIG. 3.

In the embodiment of the present disclosure, the first end portions of the second signal lines in the second signal line group are electrically connected with each other, and/or the second end portions of the second signal lines in the second signal line group are electrically connected with each other. In the case where an open circuit occurs when one of the second signal lines in the same second signal line group is broken, since the second signal lines in the second signal line group are configured to be electrically connected with each other, the other second signal lines in the second signal line group can provide a control signal to the control electrode 1 together with the corresponding first signal line. Accordingly, the erasing function is prevented from being disabled in a local area of the liquid crystal writing board, which is caused by one row or one column of control electrodes 1 being unable to control the state of the bistable liquid crystal in the corresponding area. Therefore, the product quality of the liquid crystal writing board is greatly improved.

Figure 16:
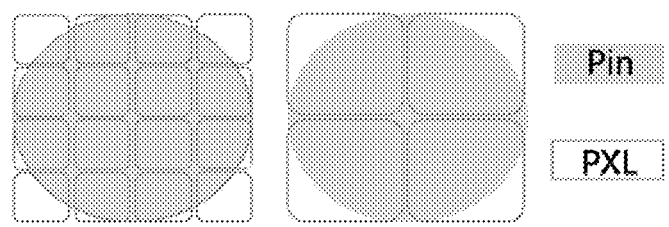
FIG. 16 is a diagram illustrating two types of structures, viewed from the top, of support terminals and sub-pixels provided by an embodiment of the present disclosure.

In addition, it should be noted that during the actual preparation of the liquid crystal writing board, a support PIN supporting the first substrate 100 on the device may generate electrostatic charges on a underlayment (for example, the first underlayment 101) of the first substrate 100 due to friction when the first substrate 100 is transferred, and electrostatic breakdown will occur when the s electrostatic charges accumulate to a certain extent, thereby causing damage to circuits or devices (for example, transistors) on the first substrate 100. In the related art, as shown in the schematic diagram on the right side in FIG. 16, a support PIN can cover 4 sub-pixels (each sub-pixel PXL includes one control electrode 1 and at least one transistor). By arranging the first signal lines in the first signal line group to be connected in parallel and arranging the second signal lines in the second signal line group to be connected in parallel (for example, by arranging as 2 rows and 2 columns to be connected in parallel, the pixel density may increase by a factor of 4; and for example, by arranging as rows and 3 columns to be connected in parallel, the pixel density may increase by a factor of 9), the pixel size can be reduced without changing the number of channels of the first driver Q1 and/or the second driver Q2. For example, referring to the schematic diagram on the left side in FIG. 16, after the pixel size is reduced, the number of sub-pixels covered by one support PIN increases. Therefore, even if static electricity occurs, the electrostatic charges on one support PIN are easily distributed to a plurality of sub-pixels, and for each sub-pixel, the static electricity effect is small, thereby preventing electrostatic charges from damaging circuits or devices (for example, transistors) on the first substrate 100, and greatly reducing the probability of occurrence of electrostatic breakdown.

The pixel size in the related art is 1 mm*1 mm. Exemplarily, in the present disclosure, a plurality of rows and columns may be arranged side-by-side such that the size of one pixel is reduced to (30 µm to 50 µm)*(30 µm to 50 µm). According to measurement and simulation calculation, when the pixel density reaches above 80 PPI, such electrostatic problems can be effectively avoided. The more parallel connections, the stronger the antistatic capability. However, if the PPI is too high, other problems will occur, such as high occurrence of broken lines caused by thin line width, or short-circuit problems caused by a narrow spacing. Accordingly, it is suggested that PPI should be selected within 80 to 200. According to the conversion of this product, 3 rows and 3 columns to 8 rows and 8 columns are preferably connected in parallel (namely, 3 DL and 3 GL to 8 DL and 8 GL).

In the present disclosure, the description is given by taking the row direction as the GL and the column direction as the DL as an example.

Herein, no limitation is made on whether the number of first signal lines (for example, DL) connected in parallel in the first signal line group is the same as the number of second signal lines (for example, GL) connected in parallel in the second signal line group.

Exemplarily, two rows and two columns can be configured to be arranged in parallel, i.e., two DLs are arranged in parallel and two GLs are arranged in parallel.

Exemplarily, two rows and three columns may be configured to be connected in parallel, i.e., two DLs are connected in parallel and three GLs are connected in parallel.

In some embodiments of the present disclosure, the liquid crystal writing board includes a second driver Q2, and first end portions of the second signal lines are electrically connected to the second driver Q2.

The structure of the second driver Q2 is not limited herein.

Exemplarily, in the case where the second signal line is a gate line (GL), the second driver Q2 may include a gate driver IC or a gate driving circuit (Gate Driven on Array circuit, GOA), which may also be referred to as a shift register circuit arranged in cascade.

Figure 15:
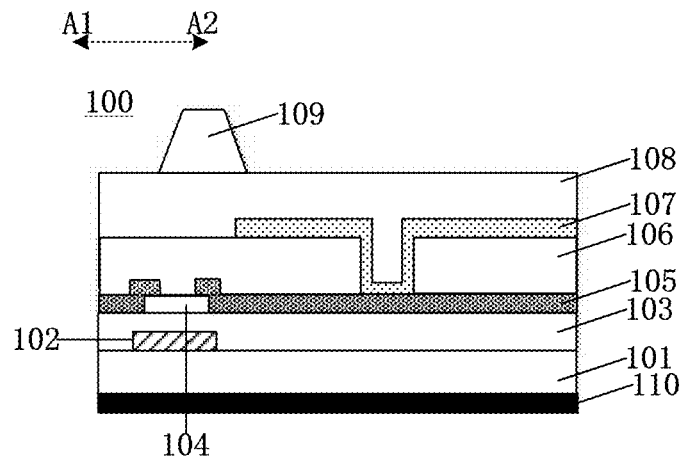
FIG. 15 is a cross-sectional structural diagram taken along a direction A1A2 in FIG. 14.

In some embodiments of the present disclosure, as shown in FIG. 15, the first substrate 100 includes:
a first underlayment 101;
a first conducting layer 102 disposed on a side of the first underlayment 101 close to the second substrate 200, including a plurality of second signal line groups;
a second conducting layer 105 disposed on a side of the first conducting layer 102 facing away from the first underlayment 101, including a plurality of first signal line groups;
a third conducting layer 107 disposed on a side of the second conducting layer 105 facing away from the first underlayment 101, including the control electrodes 1, a plurality of first connection portions, and a plurality of second connection portions; the control electrodes 1, the first connection portion, and the second connection portion being arranged in the same layer.

The first conducting layer 102 and the second conducting layer 105 include a first insulation layer 103 therebetween; the second conducting layer 105 and the third conducting layer 107 include a second insulation layer 106 therebetween.

In the case where the first end portions in the same signal line group are electrically connected with each other, the first end portions in the same signal line group are electrically connected with each other through at least one of the first connection portions; in the case where the second end portions in the same signal line group are electrically connected with each other, the second end portions in the same signal line group are electrically connected with each other through at least one of the second connection portions; the signal line group includes at least one of the first signal line groups and the second signal line groups.

In some embodiments, the first conducting layer 102 is a gate layer, the second conducting layer 105 is a source/drain (SD) metal layer, and the third conducting layer 107 is a transparent electrode layer ITO. In this case, the first signal line is a data line (DL), and the second signal line is a gate ling (GL).

In other embodiments, the first conducting layer 102 is an SD metal layer, the second conducting layer 105 is a gate layer, and the third conducting layer 107 is a transparent electrode layer ITO. In this case, the first signal line is a GL, and the second signal line is a DL.

As an example, in FIG. 3 to FIG. 14 provided by embodiments of the present disclosure, the first conducting layer 102 is a gate layer, the second conducting layer 105 is an SD metal layer, and the third conducting layer 107 is a transparent electrode layer ITO.

Assuming that the first signal line is the DL and the second signal line is the GL, the specific electrical connection arrangement mode when the first end portions of the same signal line group are electrically connected will be described below with reference to the drawings.

Figure 4:
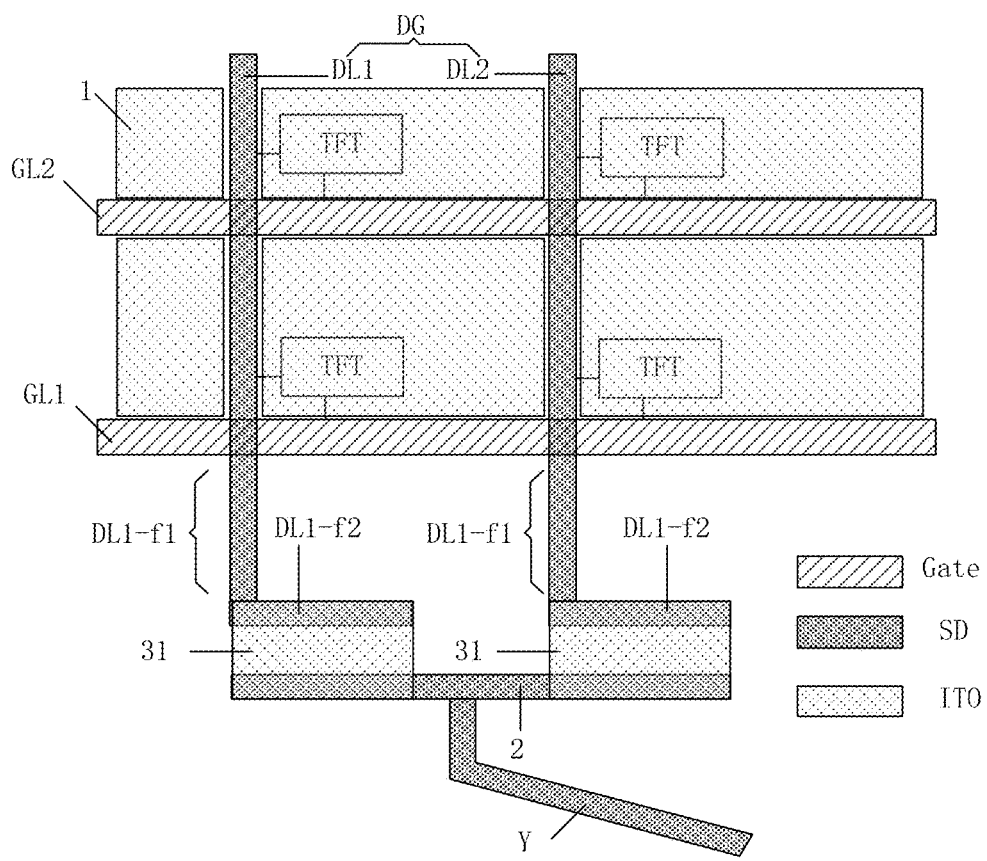
FIG. 4 to FIG. 13 are diagrams illustrating ten electrical connection modes of various signal lines in a signal line group in a liquid crystal writing board provided by an embodiment of the present disclosure.
Figure 5:
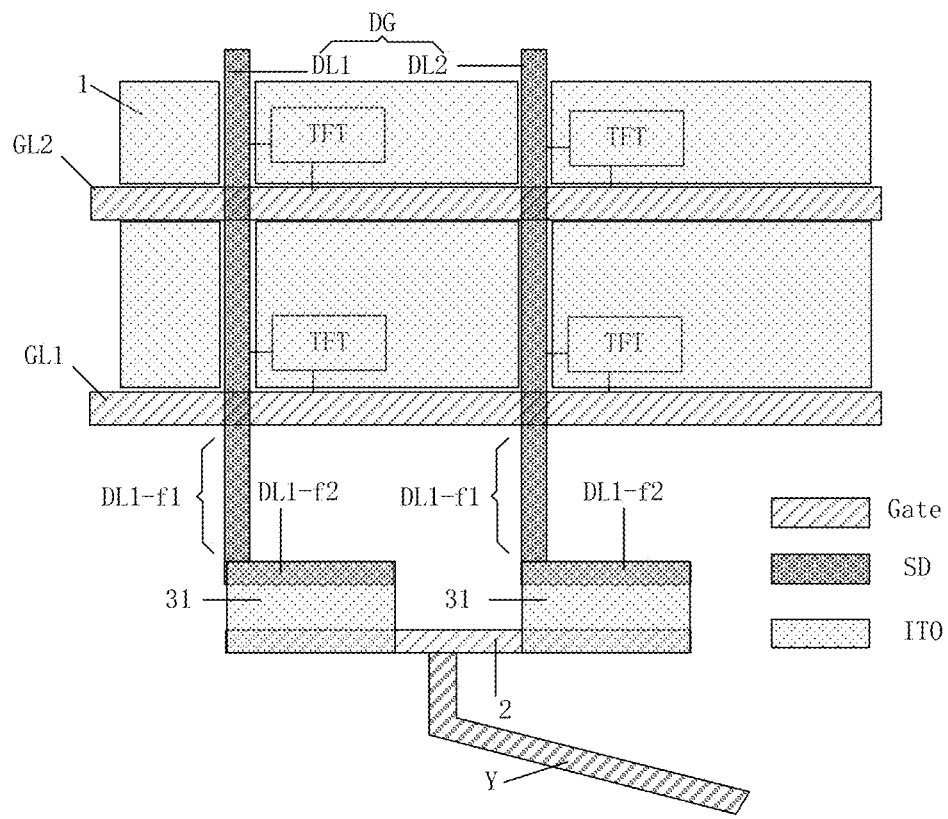
Figure 6:
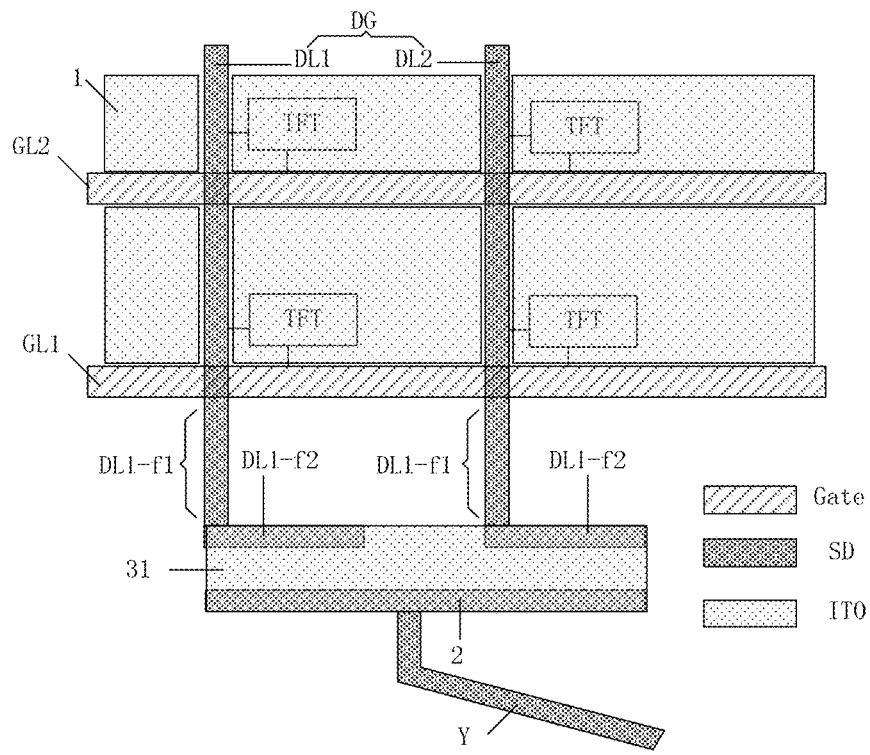

In a first case, as shown in FIG. 4 to FIG. 6, the same signal line group (for example, the first signal line group which is a data line group DG) includes a data line (DL1) and a data line (DL2), and the first end portion of the DL1 (including DL1-$f$1 and DL1-$f$2) is electrically connected with the first end portion of the DL2 (including DL2-$f$1 and DL2-$f$2) through at least one first connection portion 31.

Exemplarily, in FIG. 4 and FIG. 5, the first end portion of the DL1 (including DL1-$f$1 and DL1-$f$2) is electrically connected with the first end portion of the DL2 (including DL2-f1 and DL2-f2) through two first connection portions 31.

Exemplarily, in FIG. 6, the first end portion of the DL1 (including DL1-f1 and DL1-f2) is electrically connected with the first end portion of the DL2 (including DL2-f1 and DL2-f2) through one first connection portion 31. It should be noted that the first connection portion 31 in FIG. 6 may be regarded as two first connection portions 31 in FIG. 4 and FIG. 5 being configured to be communicated with each other.

Figure 9:
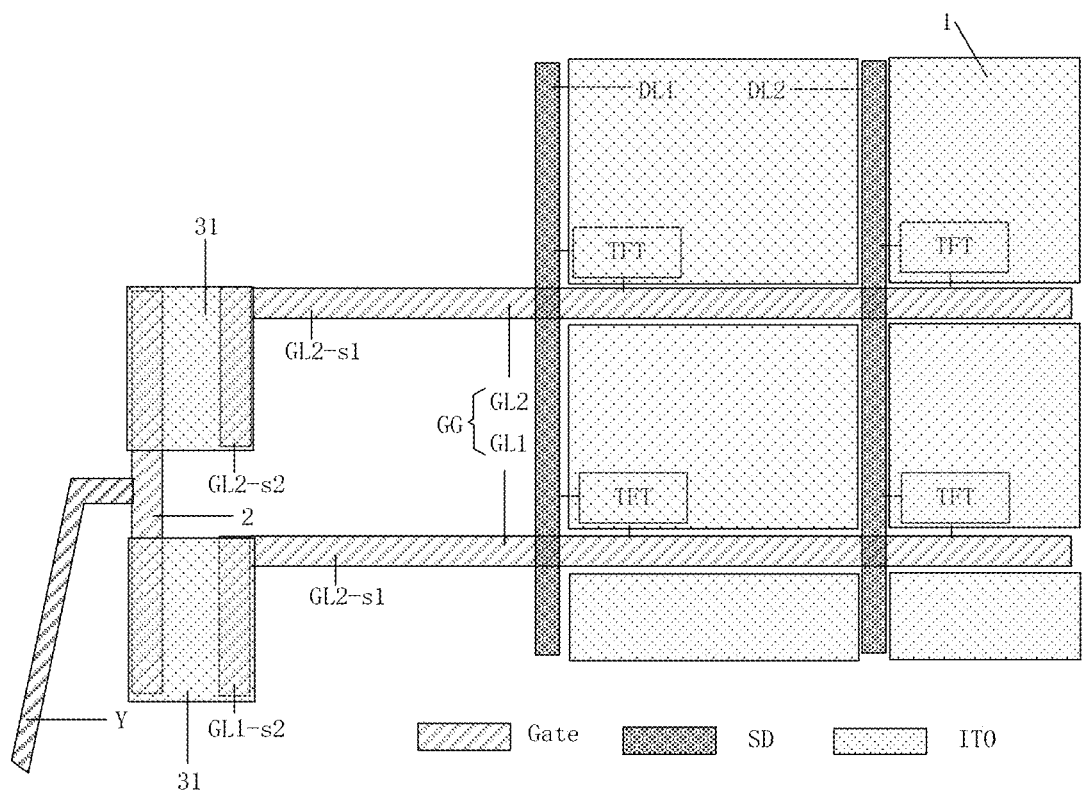
Figure 10:
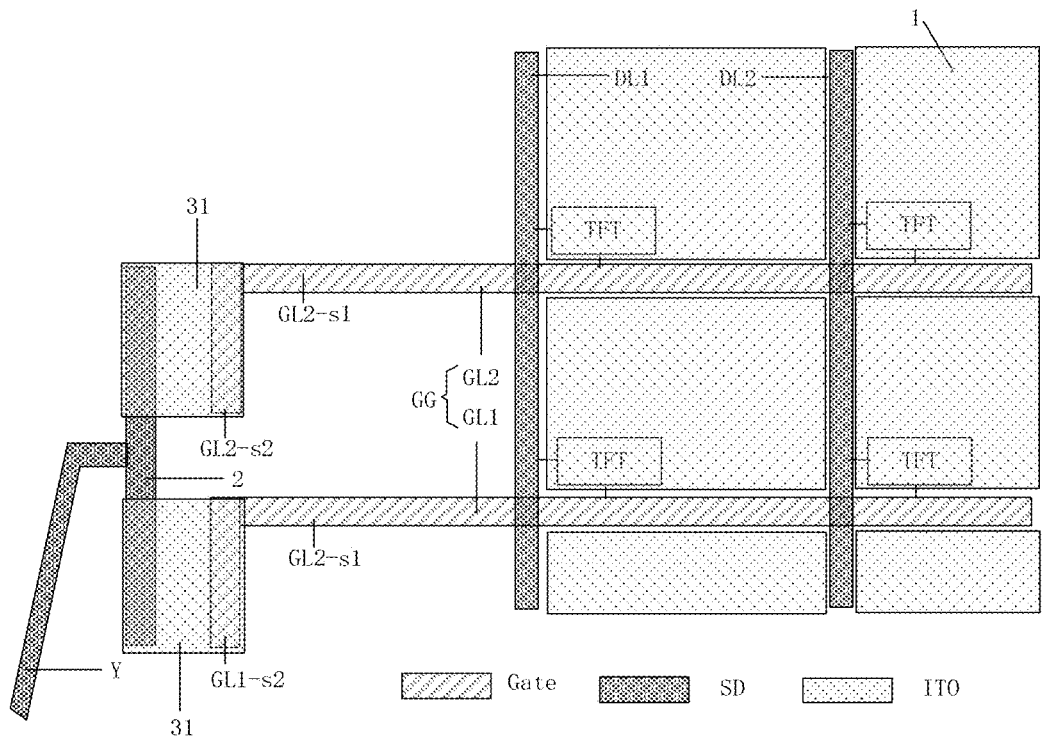
Figure 11:
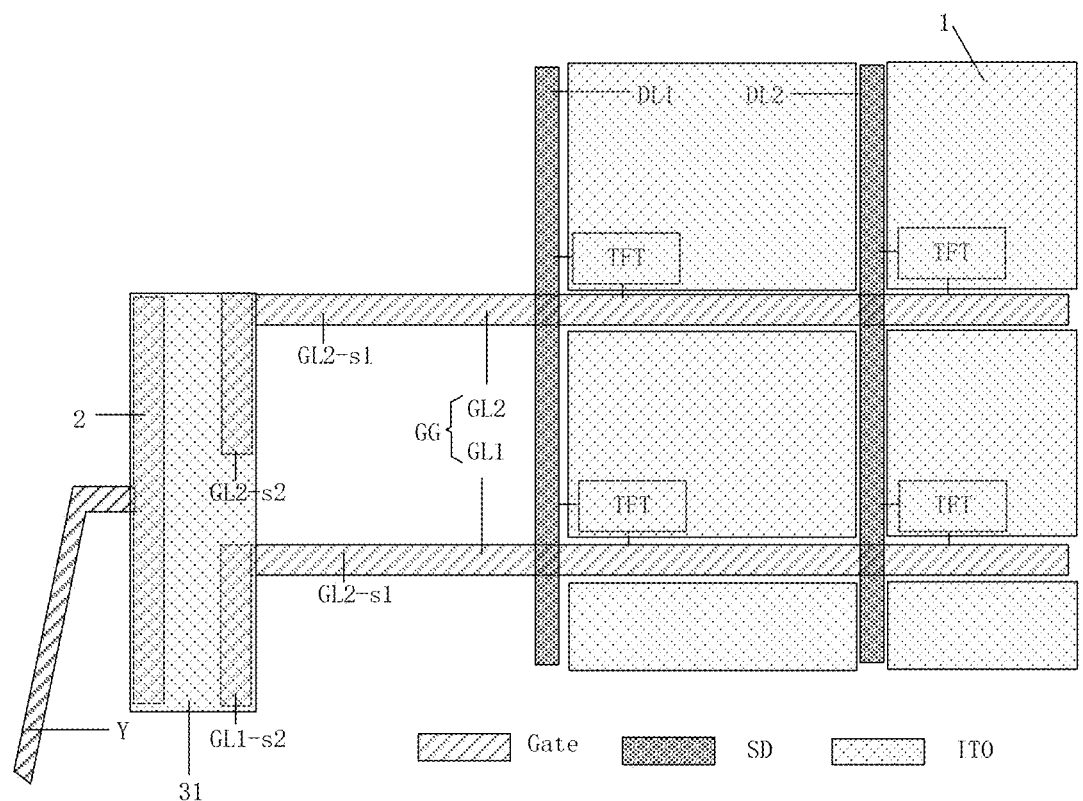

In a second case, as shown in FIG. 9 to FIG. 11, the same signal line group (for example, the second signal line group which is a gate line group (GG)) includes a gate line (GL1) and a gate line (GL2), and the first end portion of the GL1 (including GL1-s1 and GL1-s2) is electrically connected with the first end portion of the GL2 (including GL2-s1 and GL2-s2) through at least one first connection portion 31.

Exemplarily, in FIG. 9 and FIG. 10, the first end portion of the GL1 (including GL1-s1 and GL1-s2) is electrically connected with the first end portion of the GL2 (including GL2-s1 and GL2-s2) through two first connection portions 31.

Exemplarily, in FIG. 11, the first end portion of the GL1 (including GL1-s1 and GL1-s2) is electrically connected with the first end portion of the GL2 (including GL2-s1 and GL2-s2) through one first connection portion 31. It should be noted that the first connection portion 31 in FIG. 11 may be regarded as two first connection portions 31 in FIG. 9 and FIG. 10 being configured to be communicated with each other.

Assuming that the first signal line is the DL and the second signal line is the GL, the specific electrical connection arrangement mode when the second end portions of the same signal line group are electrically connected will be described below with reference to the drawings.

Figure 7:
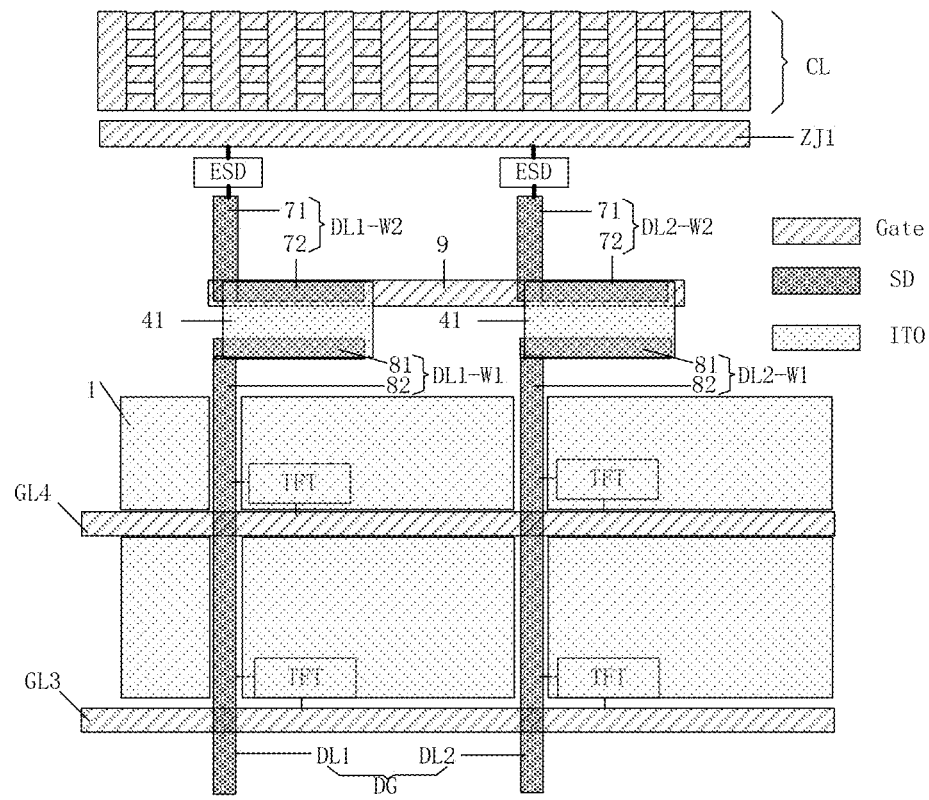
Figure 8:
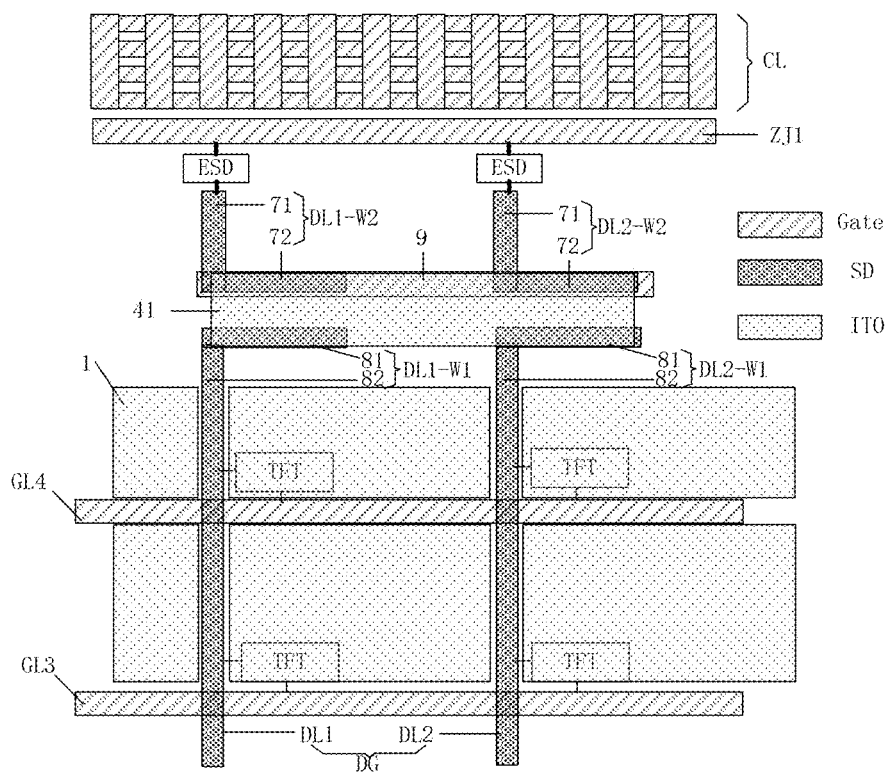

In a first case, as shown in FIG. 7 and FIG. 8, the same signal line group (for example, the first signal line group which is a DG) includes the DL1 and the DL2, and the second end portion of the DL1 (including DL1-W1 and DL1-W2) is electrically connected with the second end portion of the DL2 (including DL2-W1 and DL2-W2) through at least one second connection portion 41.

Exemplarily, in FIG. 7, the second end portion of the DL1 (including DL1-W1 and DL1-W2) is electrically connected with the second end portion of the DL2 (including DL2-W1 and DL2-W2) through two second connection portions 41.

Exemplarily, in FIG. 8, the second end portion of the DL1 (including DL1-W1 and DL1-W2) is electrically connected with the second end portion of the DL2 (including DL2-W1 and DL2-W2) through one second connection portion 41. It should be noted that the second connection portion 41 in FIG. 8 may be regarded as two second connection portions 41 in FIG. 7 being configured to be communicated with each other.

Figure 12:
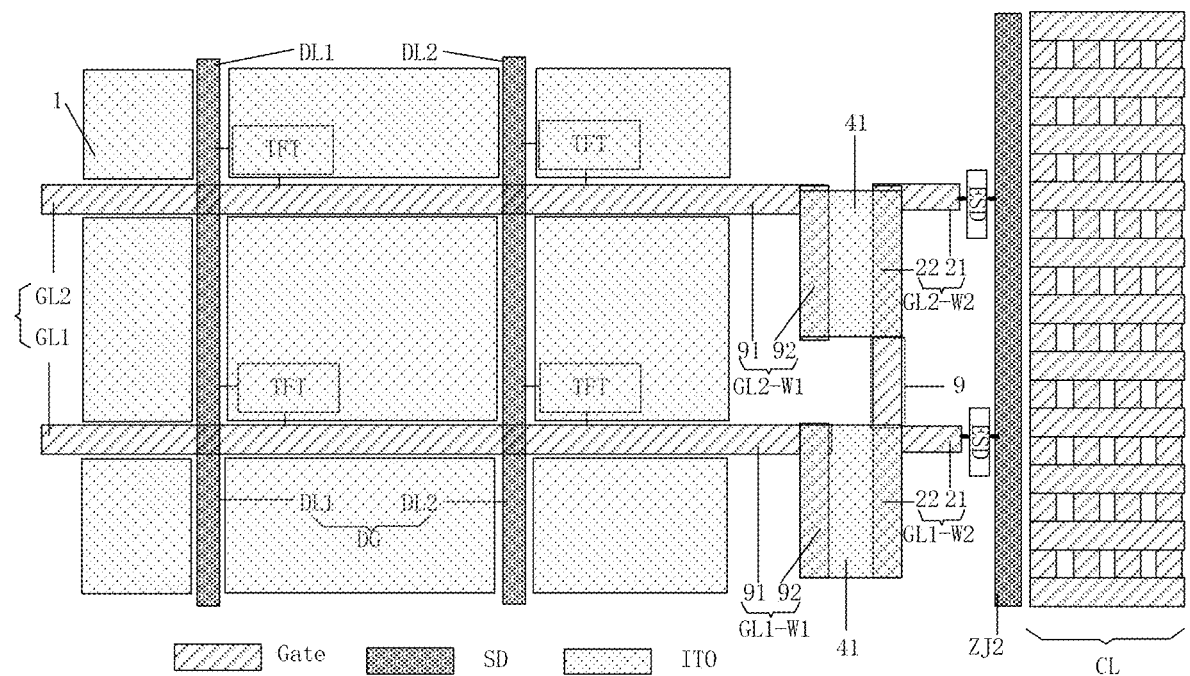
Figure 13:
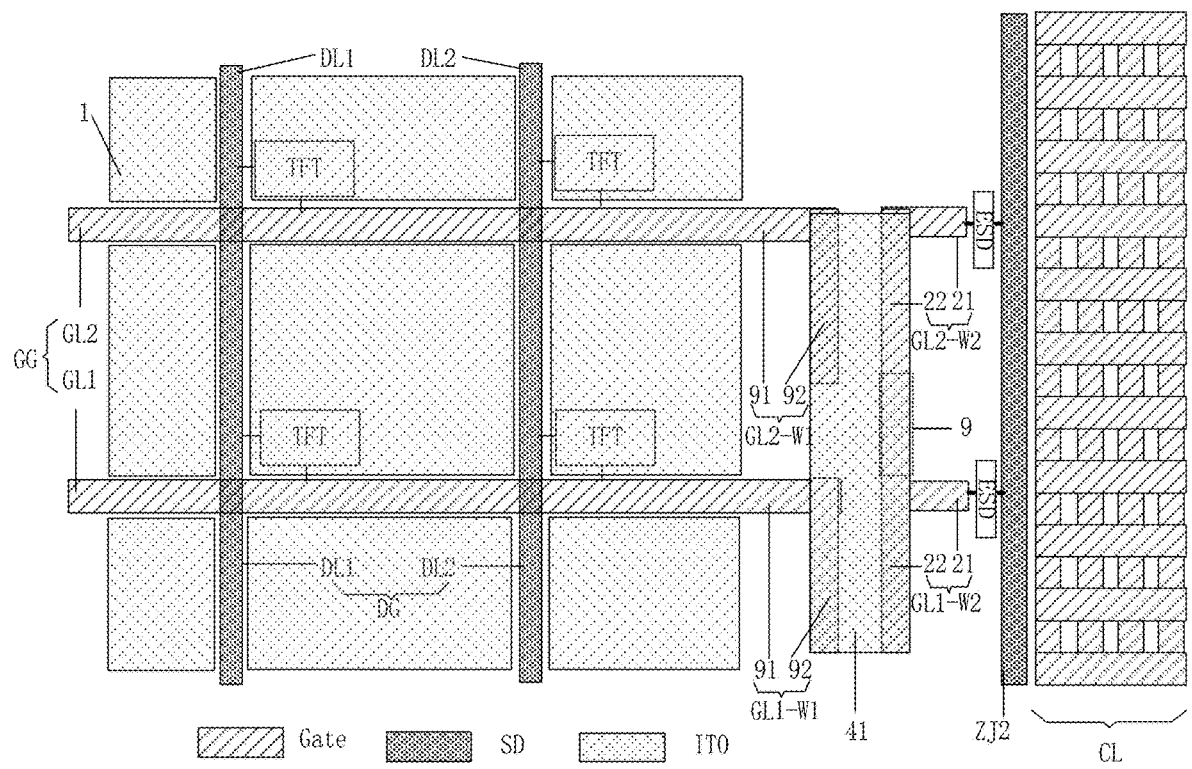

In a second case, as shown in FIG. 12 and FIG. 13, the same signal line group (for example, the second signal line group which is a GG) includes the GL1 and the GL2, and the second end portion of the GL1 (including GL1-W1 and GL1-W2) is electrically connected with the second end portion of the GL2 (including GL2-W1 and GL2-W2) through at least one second connection portion 41.

Exemplarily, in FIG. 12, the second end portion of the GL1 (including GL1-W1 and GL1-W2) is electrically connected with the second end portion of the GL2 (including GL2-W1 and GL2-W2) through two second connection portions 41.

Exemplarily, in FIG. 13, the second end portion of the GL1 (including GL1-W1 and GL1-W2) is electrically connected with the second end portion of the GL2 (including GL2-W1 and GL2-W2) through one second connection portion 41.

In some embodiments of the present disclosure, as shown in FIG. 6 and FIG. 11, the first end portions in the same signal line group are electrically connected with each other through one first connection portion, and an orthographic projection of each first end portion in the same signal line group on the first underlayment 101 overlaps with an orthographic projection of the first connection portion on the first underlayment 101.

Exemplarily, as shown in FIG. 6, in the case where the signal line group is the first signal line group, and the first signal lines in the first signal line group are the DLs, the first end portions of the same signal line group (the first end portion of one DL1 includes DL1-f1 and DL1-f2; the first end portion of another DL2 includes DL2-f1 and DL2-f2) are electrically connected with each other through one first connection portion 31, and the orthographic projection of each first end portion of the same signal line group on the first underlayment 101 overlaps with the orthographic projection of the first connection portion 31 on the first underlayment 101.

Exemplarily, as shown in FIG. 11, in the case where the signal line group is the second signal line group, and the second signal lines in the second signal line group are the GLs, the first end portions of the same signal line group (the first end portion of one GL1 includes GL1-s1 and GL1-s2; the first end portion of the other GL2 includes GL2-s1 and GL2-s2) are electrically connected with each other through one first connection portion 31, and the orthographic projection of each first end portion of the same signal line group on the first underlayment 101 overlaps with the orthographic projection of the first connection portion 31 on the first underlayment 101.

The overlapping refers to at least partly overlapping, the meaning of which hereinafter is the same as that herein and will not be repeated.

In some embodiments of the present disclosure, as shown in FIG. 8 and FIG. 13, the second end portions of the same signal line group are electrically connected with each other through one second connection portion, and the orthographic projection of each second end portion of the same signal line group on the first underlayment 101 overlaps with the orthographic projection of the second connection portion on the first underlayment 101.

Exemplarily, as shown in FIG. 8, in the case where the signal line group is the first signal line group, and the first signal lines in the first signal line group are the DLs, the second end portions of the same signal line group (the second end portion of one DL1 includes DL1-W1 and DL1-W2; the second end portion of another DL2 includes DL2-W1 and DL2-W2) are electrically connected with each other through one second connection portion 41, and the orthographic projection of each second end portion of the same signal line group on the first underlayment 101 overlaps with the orthographic projection of the second connection portion 41 on the first underlayment 101.

Exemplarily, as shown in FIG. 13, in the case where the signal line group is the second signal line group, and the second signal lines in the second signal line group are the GLs, the second end portions of the same signal line group (the second end portion of one GL1 includes GL1-W1 and GL1-W2; the second end portion of another GL2 includes GL2-W1 and GL2-W2) are electrically connected with each other through one second connection portion 41, and the orthographic projection of each second end portion of the same signal line group on the first underlayment 101 overlaps with the orthographic projection of the second connection portion 41 on the first underlayment 101.

In some embodiments of the present disclosure, as shown in FIG. 4 to FIG. 5, and FIG. 9 to FIG. 10, the first end portion includes a first line segment and a second line segment, the first line segment being connected to the conductor segment and the second line segment, respectively. The extension direction of the first line segment is the same as the extension direction of the conductor segment, and the extension direction of the second line segment intersects with the extension direction of the conductor segment.

The liquid crystal writing board includes a plurality of first shunt connection lines 2 and a plurality of leads Y that are electrically connected, the extension direction of the first shunt connection line 2 is the same as the extension direction of the second line segment, and the number of the first shunt connection lines 2 is the same as the number of signal line groups corresponding thereto, and each second line segment in the same signal line group is indirectly electrically connected with the same first shunt connection line 2.

The first end portion is at least one of the first end portion of the first signal line and the first end portion of the second signal line.

In some embodiments of the present disclosure, the second line segments in the same signal line group are electrically connected with each other through a plurality of first connection portions 31. For the same signal line group, the number of the first connection portions 31 is the same as the number of signal lines in the signal line group corresponding thereto.

The orthographic projection of the first connection portion 31 on the first underlayment 101 overlaps with the orthographic projection of the second line segment on the first underlayment 101, and the orthographic projections of the first connection portions 31 corresponding to the same signal line group on the first underlayment 101 overlap with the orthographic projection of the same first shunt connection line 2 on the first underlayment 101.

The indirect electrical connection mentioned above refers to being electrically connected through an intermediate device or intermediate conductive substance, rather than being electrically connected through a direct contact.

Exemplarily, as shown in FIG. 4 and FIG. 5, in the case where the first end portion is the first end portion of the first signal line, and the first signal line includes the DL, the first end portion of the first signal line (for example, the DL1 or the DL2) includes the first line segment (DL1-*f*1 or DL2-*f*1) and the second line segment (DL1-*f*2 or DL2-*f*2), and the first line segment (DL1-*f*1 or DL2-*f*1) is respectively connected to the conductor segment (the portion of the DL that is located in the display area AA) and the second line segment (DL1-*f*2 or DL2-*f*2); the extension direction of the first line segment (DL1-*f*1 or DL2-*f*1) is the same as that of the conductor segment, and the extension direction of the second line segment (DL1-*f*2 or DL2-*f*2) intersects with the extension direction of the conductor segment.

Exemplarily, in FIG. 4 and FIG. 5, the liquid crystal writing board includes a plurality of first shunt connection lines 2 and a plurality of leads Y that are electrically connected, the extension direction of the first shunt connection lines 2 is the same as the extension direction of the second line segments (DL1-*f*2 or DL2-*f*2), the number of the first shunt connection lines 2 is the same as the number of the signal line groups corresponding thereto (for example, the first signal line group; the first signal line group includes a DG), and each second line segment (DL1-*f*2 or DL2-*f*2) in the same signal line group is electrically connected to the same first shunt connection line 2; the first end portions (each includes the first line segment and the second line segment) in the same signal line group are electrically connected with each other through a plurality of first connection portions 31. For the same signal line group, the number of the first connection portions 31 is the same as the number of signal lines in the signal line group corresponding thereto. Exemplarily, in FIG. 4 to FIG. 5, one signal line group includes two signal lines (DL), and the number of the first connection portions 31 corresponding to the same signal line group is also two.

In some embodiments, as shown in FIG. 4, the first shunt connection line 2 and the lead Y are both disposed on the second conducting layer 105 (for example, an SD metal layer).

In some other embodiments, as shown in FIG. 5, the first shunt connection line 2 and the lead Y are both disposed on the first conducting layer 102 (for example, a gate layer).

In yet other embodiments, the first shunt connection line 2 and the lead Y may be disposed on different layers, for example, one is disposed on the first conducting layer 102 (for example, a gate layer) and the other is disposed on the second conducting layer 105 (for example, an SD metal layer).

By way of example, in FIG. 4 and FIG. 5, the orthographic projection of the first connection portion 31 on the first underlayment 101 overlaps with the orthographic projection of the second line segment (DL1-*f*2 or DL2-*f*2) on the first underlayment 101, and the orthographic projection of each first connection portion 31 corresponding to the same signal line group on the first underlayment 101 overlaps with the orthographic projection of the same first shunt connection line 2 on the first underlayment 101.

It should be noted that the first connection portion 31 and the second line segment (DL1-*f*2 or DL2-*f*2) are electrically connected by providing a via hole (not shown) in the overlapping area, and the first connection portion 31 and the first shunt connection line 2 are also electrically connected by providing a via hole in the overlapping area. As for electrical connections through via holes, reference may be made to the related art, which will not be repeated herein.

Exemplarily, as shown in FIG. 9 and FIG. 10, in the case where the first end portion is the first end portion of the second signal line, and the second signal line includes the GL, the first end portion of the second signal line includes the first line segment (GL1-*s*1 or GL2-*s*1) and the second line segment (GL1-*s*2 or GL2-*s*2), and the first line segment (GL1-*s*1 or GL2-*s*1) is respectively connected to the conductor segment (a portion of the GL that is located in the display area AA) and the second line segment (GL1-*s*2 or GL2-*s*2); the extension direction of the first line segment (GL1-*s*1 or GL2-*s*1) is the same as that of the conductor segment, and the extension direction of the second line segment (GL1-*s*2 or GL2-*s*2) intersects with the extension direction of the conductor segment.

Exemplarily, in FIG. 9 and FIG. 10, the liquid crystal writing board includes a plurality of first shunt connection lines 2 and a plurality of leads Y that are electrically connected, the extension direction of the first shunt connection lines 2 is the same as the extension direction of the second line segments (GL1-*s*2 or GL2-*s*2), the number of the first shunt connection lines 2 is the same as the number of signal line groups corresponding thereto, and each second line segment (GL1-s2 or GL2-s2) in the same signal line group is electrically connected to the same first shunt connection line 2. The first end portions in the same signal line group are electrically connected with each other through a plurality of first connection portions 31. For the same signal line group, the number of the first connection portions 31 is the same as the number of signal lines in the signal line group corresponding thereto. Exemplarily, in FIG. 9 to FIG. 10, one signal line group includes two signal lines (GL), and the number of the first connection portions 31 corresponding to the same signal line group is also two.

In some embodiments, as shown in FIG. 10, the first shunt connection line 2 and the lead Y are both disposed on the second conducting layer 105 (for example, an SD metal layer).

In some other embodiments, as shown in FIG. 9, the first shunt connection line 2 and the lead Y are both disposed on the first conducting layer 102 (for example, a gate layer).

In yet other embodiments, the first shunt connection line 2 and the lead Y may be disposed on different layers, for example, one is disposed on the first conducting layer 102 (for example, a gate layer) and the other is disposed on the second conducting layer 105 (for example, an SD metal layer).

By way of example, in FIG. 9 and FIG. 10, the orthographic projection of the first connection portion 31 on the first underlayment 101 overlaps with the orthographic projection of the second line segment (GL1-s2 or GL2-s2) on the first underlayment 101, and the orthographic projection of each first connection portion 31 corresponding to the same signal line group on the first underlayment 101 overlaps with the orthographic projection of the same first shunt connection line 2 on the first underlayment 101.

It should be noted that the first connection portion 31 and the second line segment (GL1-s2 or GL2-s2) are electrically connected by providing a via hole (not shown) in the overlapping area, and the first connection portion 31 and the first shunt connection line 2 are also electrically connected by providing a via hole in the overlapping area. As for electrical connections through via holes, reference may be made to the related art, which will not be repeated herein.

In the embodiment of the present disclosure, the first shunt connection line 2 is provided, then the first end portions of the same signal line group are electrically connected to the first shunt connection line 2 through the first connection portion 31 disposed in the third conducting layer 107 (for example, a film layer marked with ITO). In practical applications, since the third conducting layer 107 is prepared in a process after the first conducting layer 102 and the second conducting layer 105, the first end portions of the same signal line group are not electrically connected before the third conducting layer 107 is formed, and after the third conducting layer 107 is formed, the first end portions of the same signal line group are electrically connected together. In this way, the problem of electrostatic accumulation or electrostatic breakdown, caused by electrically connecting the first end portions of the same signal line group in advance, is avoided, thereby improving the preparation yield of the liquid crystal writing board and improving the quality of the product.

It should be noted that the larger the size of the liquid crystal writing board, the longer the DL or the GL. Since electrostatic charges tend to accumulate at both ends of the signal line, in practical applications, by electrically connecting the first end portions in a later process as far as possible, the electrostatic charges accumulated at the end portions of the signal line can be greatly reduced, thereby reducing the risk of occurrence of static electricity breakdown.

In some embodiments of the present disclosure, as shown in FIG. 7 and FIG. 12, the second end portion includes a first bend portion and a second bend portion that are arranged to be disconnected, the first bend portion being connected to the conductor segment.

The liquid crystal writing board further includes a plurality of second shunt connection lines 9 and a plurality of electrostatic units (ESD), the extension direction of the second shunt connection line 9 intersects with the extension direction of the conductor segment, and the electrostatic unit is connected to the second bend portion.

Each first bend portion and each second bend portion in the same first signal line group are electrically connected with the same second shunt connection line 9.

The second end portion is at least one of the second end portion of the first signal line and the second end portion of the second signal line.

In some embodiments of the present disclosure, the second end portions in the same signal line group are electrically connected with each other through a plurality of second connection portions 41. For the same signal line group, the number of the second connection portions 41 is the same as the number of signal lines in the signal line group corresponding thereto.

The first bend portions in the same signal line group are electrically connected with the same second shunt connection line 9 through the second connection portions 41, and the orthographic projection of the second connection portion 41 on the first underlayment 101 respectively overlaps with the orthographic projection of the first bend portion on the first underlayment 101 and the orthographic projection of the second bend portion of the same signal line on the first underlayment 101.

The second bend portions in the same signal line group are electrically connected with the same second shunt connection line 9; the orthographic projection of each second bend portion in the same signal line group on the first underlayment 101 overlaps with the orthographic projection of the same second shunt connection line 9 on the first underlayment 101, or each second bend portion in the same signal line group is of an integrated structure with the second shunt connection line 9.

A further explanation is given below with respect to the case that the second end portion is the second end portion of the first signal line.

Exemplarily, as shown in FIG. 7, as an example, the first signal line includes the DL, the second end portion of the first signal line (for example, the DL1) includes the first bend portion DL1-W1 and the second bend portion DL1-W2 that are arranged to be disconnected, and the first bend portion DL1-W1 is connected with the conductor segment.

Exemplarily, the liquid crystal writing board further includes a plurality of second shunt connection lines 9 and a plurality of electrostatic units (ESD), the extension direction of the second shunt connection line 9 intersects with the extension direction of the conductor segment (a portion of the DL that is located at the display area AA), and the electrostatic unit (ESD) is connected to the second bend portion DL1-W2; the first bend portions DL1-W1 and DL2-W1 and the second bend portions DL1-W2 and DL2-W2 in the same first signal line group (for example, the DG) are all electrically connected with the same second shunt connection line 9.

Exemplarily, as shown in FIG. 7, the second end portions (the second end portion includes the first bend portion DL1-W1 and the second bend portion DL1-W2) in the same signal line group are electrically connected with through a plurality of second connection portions 41. For the same signal line group, the number of the second connection portions 41 is the same as the number of signal lines in a corresponding signal line group. For example, the DG includes two DL, and the number of the second connection portions 41 corresponding to the same DG is two.

Exemplarily, as shown in FIG. 7, the first bend portions (for example, DL1-W1 and DL2-W1) in the same signal line group are electrically connected with the same second shunt connection line 9 through the second connection portions 41; the orthographic projection of the second connection portion 41 on the first underlayment 101 respectively overlaps with the orthographic projection of the first bend portion (DL1-W1) on the first underlayment 101 and the orthographic projection of the second bend portion (DL1-W2) of the same signal line on the first underlayment 101.

Exemplarily, as shown in FIG. 7, each second bend portion (such as DL1-W2 and DL2-W2) in the same signal line group is directly electrically connected with the same second shunt connection line 9, and the orthographic projection of each second bend portion (such as DL1-W2 and DL2-W2) in the same signal line group on the first underlayment 101 overlaps with the orthographic projection of the same second shunt connection line 9 on the first underlayment 101. In this case, the second bend portions and the second shunt connection line 9 are disposed in different layers, for example, the second shunt connection line 9 is disposed in the first conducting layer 102 (for example, a gate layer), and the second bend portions are disposed in the second conducting layer 105 (for example, an SD metal layer).

Exemplarily, each second bend portion (such as DL1-W2 and DL2-W2) in the same signal line group is directly electrically connected to the same second shunt connection line 9, and the second bend portions in the same signal line group are of an integrated structure with the second shunt connection line 9. In this case, the second shunt connection line 9 and the second bend portions (for example, DL1-W2 and DL2-W2) may be disposed in the same layer, for example, both being disposed in the first conducting layer 102 (for example, the gate layer); for another example, both are located in the second conducting layer 105 (for example, the SD metal layer).

Exemplarily, the shape of the orthographic projection of the first bend portion and the second bend portion on the first underlayment 101 may include an arc shape and an 'L' shape. For example, as shown in FIG. 7, the first bend portion (DL1-W1) includes a first extending portion 81 and a second extending portion 82; the second bend portion (DL1-W2) includes a third extending portion 71 and a fourth extending portion 72, the second extending portion 82 and the third extending portion 71 extend in the same direction, and the fourth extending portion 72 and the first extending portion 81 extend in the same direction.

A further explanation is given below with respect to the case that the second end portion is the second end portion of the second signal line.

By way of example, as shown in FIG. 12, the second signal line includes the GL, the second end portion of the second signal line (for example, GL1) includes a first bend portion GL1-W1 and a second bend portion GL1-W2 that are arranged to be disconnected, the first bend portion GL1-W1 is connected to a conductor segment (a portion of the GL1 that is located at the display area AA).

Exemplarily, as shown in FIG. 12, the liquid crystal writing board further includes a plurality of second shunt connection lines 9 and a plurality of electrostatic units (ESD), the extension direction of the second shunt connection line 9 intersects with the extension direction of the conductor segment, and the electrostatic unit (ESD) is connected with the second bend portion GL1-W2; each first bend portion GL1-W1, GL2-W1 and each second bend portion GL1-W2, GL2-W2 in the same first signal line group (for example, a GG) is electrically connected to the same second shunt connection line 9.

Exemplarily, as shown in FIG. 12, the second end portions in the same signal line group are electrically connected with each other through a plurality of second connection portions 41, for the same signal line group, the number of second connection portions 41 is the same as the number of signal lines in the signal line group. For example, if the GG includes two GLs, the number of the second connection portions 41 is two.

Exemplarily, as shown in FIG. 12, the first bend portions GL1-W1 and GL2-W1 in the same signal line group are electrically connected with the same second shunt connection line 9 through the second connection portion 41, and the orthographic projection of the second connection portion 41 on the first underlayment 101 respectively overlaps with the orthographic projection of the first bend portion GL1-W1 or GL2-W1 on the first underlayment 101 and the orthographic projection of the second bend portion GL1-W2 or GL2-W2 of the same signal line on the first underlayment 101.

Exemplarily, the second bend portions GL1-W2 and GL2-W2 in the same signal line group (for example, the GG) are directly electrically connected with the same second shunt connection line 9, and the orthographic projection of each of the second bend portions GL1-W2 and GL2-W2 in the same signal line group (for example, the GG) on the first underlayment 101 overlaps with the orthographic projection of the same second shunt connection line 9 on the first underlayment 101. In this case, the second bend portions and the second shunt connection line 9 are disposed in different layers, for example, the second shunt connection line 9 is disposed in the first conducting layer 102 (for example, a gate layer), and the second bend portions are disposed in the second conducting layer 105 (for example, an SD metal layer).

Exemplarily, as shown in FIG. 12, the second bend portions GL1-W2 and GL2-W2 in the same signal line group (for example, a GG) are directly electrically connected with the same second shunt connection line 9; the second bend portions GL1-W2 and GL2-W2 in the same signal line group (for example, a GG) and the second shunt connection line 9 are of an integrated structure. In this case, the second bend portions GL1-W2 and GL2-W2 and the second shunt connection line 9 are all disposed in the same layer, for example, the second bend portions GL1-W2 and GL2-W2 and the second shunt connection line 9 are all disposed in the first conducting layer 102 (for example, a gate layer), as shown in FIG. 12. Of course, the second bend portions GL1-W2 and GL2-W2 and the second shunt connection line 9 may also be disposed in the second conducting layer 105 (for example, the SD metal layer).

In the embodiments of the present disclosure, the lead Y electrically connected with the DL may be referred to as a first lead Y1, and the first lead Y1 is electrically connected with the first driver Q1; the lead Y electrically connected with the GL may be referred to as a second lead Y2, the second lead Y2 is electrically connected with the second driver Q2.

In the embodiment of the present disclosure, the second shunt connection line 9 is provided, then the second end portions of the same signal line group are electrically connected to the second shunt connection line 9 through the second connection portion 41 disposed in the third conducting layer 107 (for example, a film layer marked with ITO). In practical applications, since the third conducting layer 107 is prepared in a process after the preparation of the first conducting layer 102 and the second conducting layer 105, the second end portions of the same signal line group are not electrically connected before the third conducting layer 107 is formed, and after the third conducting layer 107 is formed, the second end portions of the same signal line group are electrically connected together. In this way, the problem of electrostatic accumulation or electrostatic breakdown, caused by electrically connecting the second end portions of the same signal line group in advance, is avoided, thereby improving the preparation yield of the liquid crystal writing board and improving the quality of the product.

Figure 14:
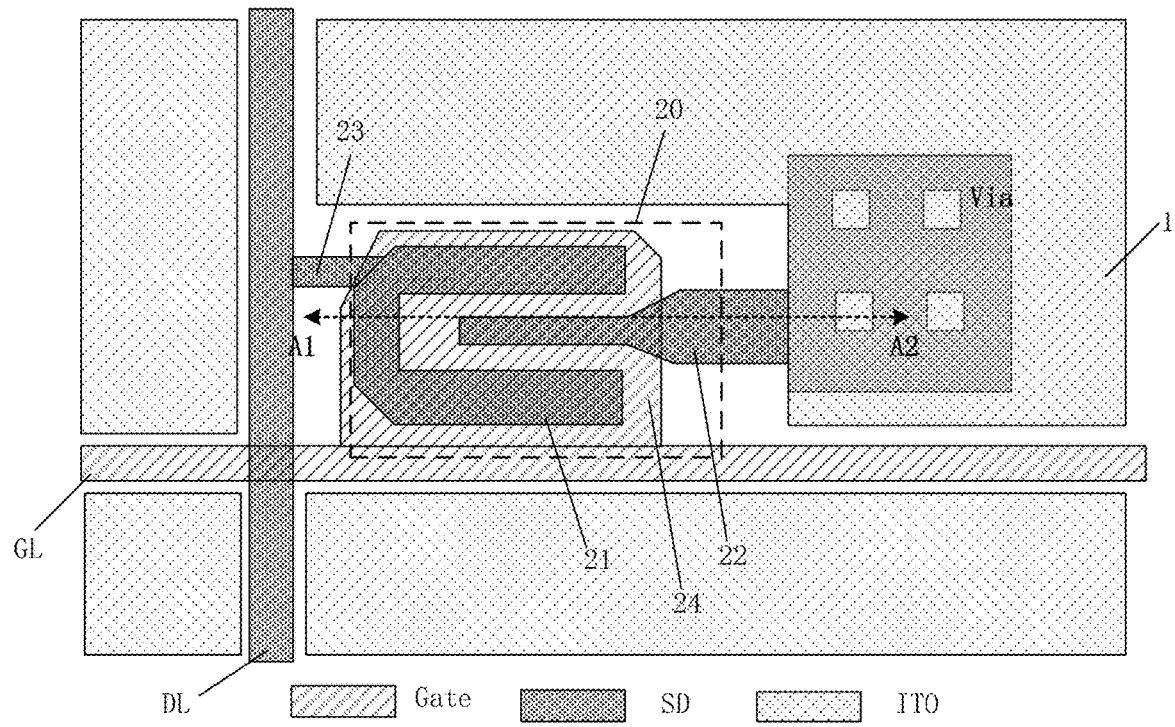
FIG. 14 is a top view of a transistor in a liquid crystal writing board provided by an embodiment of the present disclosure.

In some embodiments of the present disclosure, as shown in FIG. 14, the first substrate 100 further includes a plurality of transistors 20 arranged in an array, and the control electrode 1 is connected to the DL through the transistor 20. A source electrode 21 of the transistor 20 is electrically connected to the DL, a drain electrode 22 of the transistor 20 is electrically connected to the control electrode 1, and a gate of the transistor 20 is electrically connected to the GL.

The first substrate 100 further includes a plurality of connection lines 23. A gap exists between the orthographic projection of the source electrode 21 of the transistor 20 on the first underlayment 101 and the orthographic projection of the DL on the first underlayment 101, and the source electrode 21 of the transistor 20 is electrically connected with the DL through the connection line 23.

Exemplarily, the source electrode 21 of the transistor 20 and the DL are both disposed in the second conducting layer 105.

Exemplarily, the transistor 20 may be a thin film transistor (TFT) or a complementary metal oxide semiconductor field effect transistor (CMOS).

In the embodiment of the present disclosure, the source electrode 21 of the transistor 20 and the DL are not of an integrated configuration, and the two are electrically connected through a conductive line 23. Thus, in the case where a short circuit occurs between the gate 24 and the source electrode 21 of the transistor 20, the transistor 20 can be sacrificed by cutting off the conductive line 23, so that the signal in the DL is normally transmitted, and the signal transmission disorder of the entire DL in the case where the short circuit occurs between the gate 24 and the source electrode 21 of the transistor 20 can be avoided.

In some embodiments of the present disclosure, the first signal line includes a DL, and the second signal line includes a GL; or the second signal line includes a DL, and the first signal line includes a GL. In the embodiments and drawings of the present disclosure, illustration is made by taking the first signal line including a DL and the second signal line including a GL as an example.

In some embodiments of the present disclosure, in the case where the first signal line is the DL and the second signal line is the GL, the first driver Q1 includes at least one data driver IC (for example, source FPC) and the second driver Q2 includes at least one gate driver IC (for example, gate FPC) or a shift register circuit (GOA circuit) arranged in cascade.

In the case where the second signal line is the DL and the first signal line is the GL, the second driver Q2 includes at least one data driver IC, and the first driver Q1 includes at least one gate driver IC or a shift register circuit arranged in cascade.

In some embodiments of the present disclosure, as shown in FIG. 15, the first substrate 100 further includes a third insulation layer 108 located between the third conducting layer 107 and the bistable liquid crystal layer 300; the second substrate 200 includes a second underlayment 201 and a fourth conducting layer 202 disposed on the second underlayment 201; the second underlayment 201 is a flexible underlayment. FIG. 15 is a cross-sectional view taken along the direction A1A2 in FIG. 14.

Exemplarily, materials of the flexible underlayment may include PI, PET, or a surface-treated polymer film, and the like.

Exemplarily, the material of the third insulation layer 108 may include at least one of silicon oxide, silicon nitride, or silicon oxynitride.

Optionally, the first substrate 100 further includes a light absorption layer 110 disposed on a side of the first underlayment 101 facing away from the first conducting layer 102.

For example, the material of the light absorption layer 110 may include a black ink or a black film.

As another example, the light absorption layer 110 may be made of the same material as the black matrix BM.

Optionally, the first substrate 100 further includes an isolation pillar 109 (not depicted in FIG. 14).

Optionally, the material of the first insulation layer 103 may be provided as a black material to simultaneously achieve functions of insulation and light absorption.

It should be noted that in the embodiments of the present disclosure, an electric field is formed between the control electrode 1 and the third conducting layer 107 of the liquid crystal writing board so as to control the state of the liquid crystal. The second substrate 200 is a flexible underlayment, when being touched by a user, a short circuit easily occurs between the control electrode 1 and the third conducting layer 107. By providing the third insulation layer 108 between the third conducting layer 107 and the bistable liquid crystal layer 300, the problem of short circuit between the control electrode 1 and the third conducting layer 107 of the liquid crystal writing board in the related art can be improved.

In some embodiments of the present disclosure, the number of the first signal lines included in the first signal line group ranges from 2 to 8; the number of the second signal lines included in the second signal line group ranges from 2 to 8.

Exemplarily, the number of the first signal lines included in the first signal line group ranges from 2 to 8, and it can be understood that the first signal line group includes 2 to 8 first signal lines that are arranged in parallel.

Exemplarily, the number of the second signal lines included in the second signal line group ranges from 2 to 8, and it can be understood that the second signal line group includes 2 to 8 second signal lines that are arranged in parallel.

Exemplarily, the first signal line may be the DL, and one DG may include 2 to 8 DLs electrically connected.

Exemplarily, the second signal line may be the GL, and one GG may include 2 to 8 GLs electrically connected.

No limitation is made herein on whether the number of the first signal lines (for example, DL) arranged in parallel in the first signal line group is the same as the number of the second signal lines (for example, GL) arranged in parallel in the second signal line group.

Exemplarily, two DLs may be arranged in parallel, and two GLs may be arranged in parallel.

Exemplarily, two DLs may be arranged in parallel, and three GLs may be arranged in parallel.

In an embodiment of the present disclosure, the liquid crystal writing board may further include a gate insulation layer 103, an active layer 104 and an organic layer 106 as shown in FIG. 15; the liquid crystal writing board may further include a common electrode line CL and a common electrode conductive terminal CL Pad as shown in FIG. 3. Exemplarily, the common electrode line CL is in a grid-like structure.

Moreover, as shown in FIG. 3, each of the electrostatic units ESD electrically connected to the DL is further connected to the common electrode line CL through a first adapter line ZJ1, and each of the electrostatic units ESD electrically connected to the GL is further connected to the common electrode line CL through a second adapter line ZJ2. As an example, the electrostatic unit ESD may include a diode having a unidirectional conduction property. When electrostatic charges accumulate on the DL or the GL, the electrostatic unit ESD conducts, and electrostatic charges can be discharged to the common electrode line CL through the electrostatic unit ESD, thereby improving the antistatic capability of the liquid crystal writing board.

Of course, the above liquid crystal writing board may include other structures and components, and specific reference may be made to the related art, which will not be further described herein.

An embodiment of the present disclosure provides a method for repairing a liquid crystal writing board as described above, the method includes steps below.

At S901, in the case where one of the first signal lines in the first signal line group is disconnected, any one of the first signal lines other than the disconnected first signal line in the first signal line group transmits an electrical signal to the disconnected first signal line.

By way of example, the first signal line may be a DL, or the first signal line may be a GL.

As shown in FIG. 17, for example, the first signal line is the DL, when one DL in one data line group DG is disconnected (at the position marked with x), another DL in the same DG can transmit an electrical signal to the disconnected DL along the direction indicated by the dotted arrow, so that the DL and the GL can still jointly provide a control signal to the control electrode 1. In this way, it is ensured that the erasing function in a local area of the liquid crystal writing board (the area where the position marked with x is located) is not affected, thereby improving the quality of the liquid crystal writing board.

An embodiment of the present disclosure provides a method for repairing a liquid crystal writing board as stated above, a first signal line includes a DL, and a second signal line includes a GL; the method includes steps below.

Figure 18:
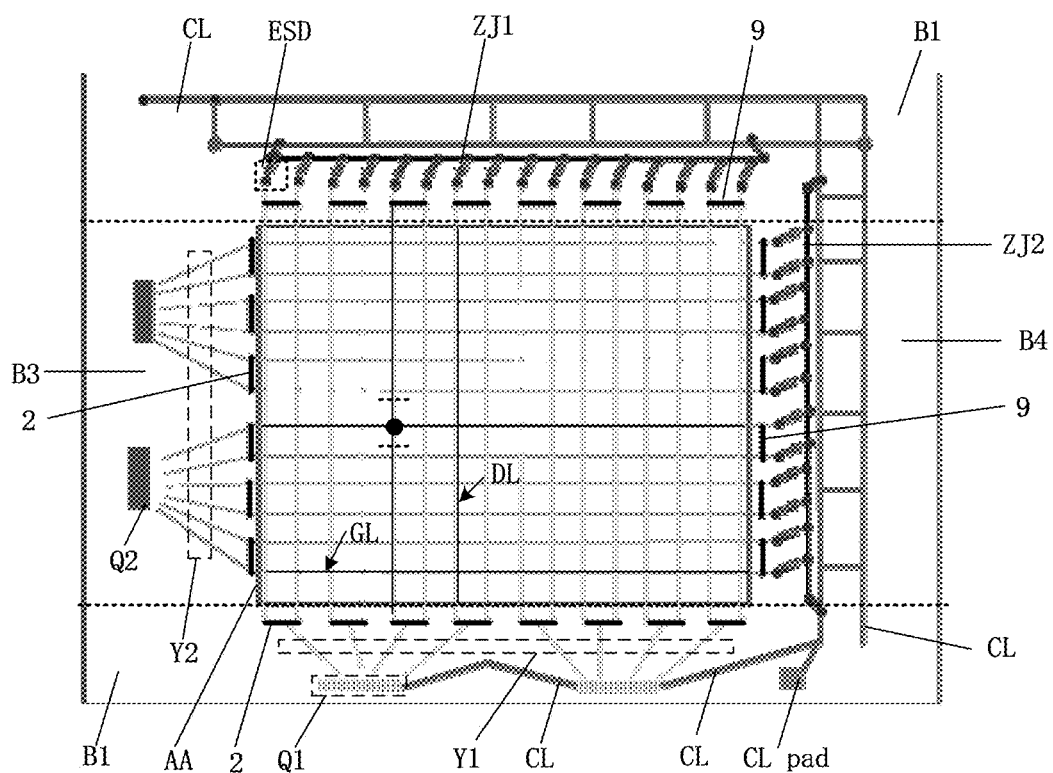

At S902, as shown in FIG. 18, in the case where the short circuit occurs between the DL and the GL (at the position marked by '•'), a cutting processing is performed on the DL at the two sides of the position where short circuit occurs (for example, cutting off the positions on the DL marked by dotted lines), so that the DL located between the cut positions is disconnected from the DL on both sides thereof; the DL other than the cut DL in the first signal line group transmits electric signals to the cut DL.

In an exemplary embodiment, for the cutting processing performed on the DL at two sides of the position where short circuit occurs, and the cutting position can be selected to be arranged in an area between two GLs adjacent to the abnormal GL, thus avoiding cutting too many DLs to cause multiple rows of sub-pixels to be broken, resulting in a waste. In this way, the repair quality of the liquid crystal writing board can be further improved.

In the embodiment of the present disclosure, the DL and the GL can still jointly provide a control signal to the control electrode 1 through a cutting process, ensuring that the erasing function in a local area of the liquid crystal writing board is not affected, thereby improving the quality of the liquid crystal writing board.

The above is only specific embodiments of the present disclosure, and the protection scope of the present disclosure is not limited thereto. Those skilled in the art can easily conceive of changes or replacements within the scope of the technology disclosed in this disclosure, which should be covered within the scope of protection of the disclosure. Therefore, the protection scope of the present disclosure should be determined by the protection scope of the claims.

The invention claimed is:

1. A liquid crystal writing board, comprising a first substrate, a second substrate, and a bistable liquid crystal layer disposed between the first substrate and the second substrate,
   wherein the first substrate comprises:
   a plurality of first signal line groups, wherein the first signal line groups each comprise at least two first signal lines;
   a plurality of second signal lines, wherein the second signal lines and the first signal lines intersect with each other; and
   a control electrode disposed in an area surrounded by two adjacent first signal lines and two adjacent second signal lines, the first signal lines and the second signal lines being configured to jointly provide a control signal to the control electrode,
   wherein the first signal lines in each first signal line group are electrically connected with each other;
   wherein the liquid crystal writing board comprises a display area and a peripheral area surrounding the display area, and the peripheral area comprises a first peripheral sub-area and a second peripheral sub-area arranged opposite to each other;
   wherein the first signal lines each comprise a first end portion, a second end portion, and a conductor segment between the first end portion and the second end portion, the first end portion being located at the first peripheral sub-area, the second end portion being located at the second peripheral sub-area, and the conductor segment being located at the display area;
   wherein the first signal lines in each first signal line group are electrically connected with each other by at least one of:
   the first end portions of the first signal lines in each first signal line group being electrically connected with each other; and
   the second end portions of the first signal lines in each first signal line group being electrically connected with each other;
   wherein the liquid crystal writing board comprises a first driver, and the first end portions of the first signal lines are all electrically connected to the first driver;
   wherein the first substrate further comprises a plurality of second signal line groups, the second signal line groups each comprise at least two second signal lines, and the second signal lines in each second signal line group are electrically connected with each other;

wherein the peripheral area further comprises a third peripheral sub-area and a fourth peripheral sub-area arranged opposite to each other, and the third peripheral sub-area is arranged adjacent to the first peripheral sub-area;

wherein the second signal lines each comprise a first end portion, a second end portion, and a conductor segment between the first end portion and the second end portion, the first end portion being located at the third peripheral sub-area, the second end portion being located at the fourth peripheral sub-area, and the conductor segment being located at the display area;

wherein the second signal lines in each second signal line group are electrically connected with each other by at least one of:

the first end portions of the second signal lines in each second signal line group being electrically connected with each other; and the second end portions of the second signal lines in each second signal line group being electrically connected with each other.

2. A method for repairing the liquid crystal writing board according to claim 1, wherein the first signal line comprises a data line, and the second signal line comprises a gate line, the method comprises:

in response to a short circuit occurred between the data line and the gate line, cutting, the data line on two sides of a position where the short circuit occurred, so that the data line located between cutting positions is disconnected from the data line at two sides, and an electrical signal is transmitted to the cut data line by the data lines in the first signal line group other than the cut data line.

3. The liquid crystal writing board according to claim 1, wherein the second signal line comprises a data line, and the first signal line comprises a gate line.

4. The liquid crystal writing board according to claim 3, wherein the second driver comprises at least one data driver, and the first driver comprises at least one gate driver or a shift register circuit arranged in cascade.

5. The liquid crystal writing board according to claim 1, wherein the liquid crystal writing board comprises a second driver, and the first end portions of the second signal lines are all electrically connected to the second driver.

6. The liquid crystal writing board according to claim 5, wherein the first substrate comprises:

a first underlayment;

a first conducting layer disposed on a side of the first underlayment close to the second substrate, wherein the first conducting layer comprises the plurality of second signal line groups;

a second conducting layer disposed on a side of the first conducting layer facing away from the first underlayment, wherein the second conducting layer comprises the plurality of first signal line groups; and a third conducting layer disposed on a side of the second conducting layer facing away from the first underlayment, wherein the third conducting layer comprises the control electrode, a plurality of first connection portions, and a plurality of second connection portions, wherein the control electrode, the first connection portions, and the second connection portions are disposed on a same layer;

wherein a first insulation layer is disposed between the first conducting layer and the second conducting layer, and a second insulation layer is disposed between the second conducting layer and the third conducting layer;

wherein when the first end portions in a same signal line group are electrically connected with each other, the first end portions in the same signal line group are electrically connected with each other through at least one of the first connection portions; when the second end portions in a same signal line group are electrically connected with each other, the second end portions in the same signal line group are electrically connected with each other through at least one of the second connection portions; the signal line group comprises at least one of the first signal line groups and the second signal line groups.

7. The liquid crystal writing board according to claim 6, wherein the first end portions in the same signal line group are electrically connected with each other through one first connection portion, and an orthographic projection of each of the first end portions in the same signal line group on the first underlayment overlaps with an orthographic projection of the first connection portion on the first underlayment; and the second end portions in the same signal line group are electrically connected with each other through one second connection portion, and an orthographic projection of each of the second end portions in the same signal line group on the first underlayment overlaps with an orthographic projection of the second connection portion on the first underlayment.

8. The liquid crystal writing board according to claim 6, wherein the first end portion comprises a first line segment and a second line segment, and the first line segment is connected to the conductor segment and the second line segment respectively; an extension direction of the first line segment is the same as extension direction of the conductor segment, and the extension direction of the second line segment intersects with the extension direction of the conductor segment;

wherein for each signal line group, the liquid crystal writing board comprises a first shunt connection line and a lead that are electrically connected; the extension direction of the first shunt connection line is the same as the extension direction of the second line segment; a number of the first shunt connection lines is the same as the number of the signal line groups corresponding to the first shunt connection lines; and the second line segments in the same signal line group are indirectly electrically connected to the same first shunt connection line;

wherein the first end portion is at least one of the first end portion of the first signal line and the first end portion of the second signal line.

9. The liquid crystal writing board according to claim 8, wherein the second line segments in the same signal line group are electrically connected with each other through multiple first connection portions; for the same signal line group, the number of the first connection portions is the same as the number of signal lines in the signal line group corresponding to the first connection portions;

wherein an orthographic projection of the first connection portion on the first underlayment overlaps with an orthographic projection of the second line segment on the first underlayment, and the orthographic projections of the first connection portions corresponding to the same signal line group on the first underlayment overlap with the orthographic projection of the same first shunt connection line on the first underlayment.

10. The liquid crystal writing board according to claim 6, wherein the second end portion comprises a first bend portion and a second bend portion, the first bend portion is connected to the conductor segment;

wherein for each signal line group, the liquid crystal writing board further comprises a second shunt connection line and an electrostatic unit, an extension direction of the second shunt connection line intersects with an extension direction of the conductor segment, and the electrostatic unit is connected to the second bend portion;

wherein the first bend portions and the second bend portions in the same first signal line group are electrically connected to the same second shunt connection line;

wherein the second end portion is at least one of the second end portion of the first signal line and the second end portion of the second signal line.

11. The liquid crystal writing board according to claim 10, wherein the second end portions in the same signal line group are electrically connected with each other through multiple second connection portions; for the same signal line group, the number of the second connection portions is the same as the number of signal lines in the signal line group corresponding to the second connection portions;

wherein the first bend portions in the same signal line group are electrically connected to the same second shunt connection line through the second connection portions, and an orthographic projection of the second connection portion on the first underlayment overlaps with an orthographic projection of the first bend portion on the first underlayment and an orthographic projection of the second bend portion of the same signal line on the first underlayment respectively; and the second bend portions in the same signal line group are electrically connected to the same second shunt connection line; orthographic projections of the second bend portions in the same signal line group on the first underlayment overlap with an orthographic projection of the same second shunt connection line on the first underlayment, or the second bend portions in the same signal line group and the second shunt connection line are of an integrated structure.

12. The liquid crystal writing board according to claim 1, wherein the first substrate further comprises a plurality of transistors arranged in an array, and the control electrode is connected to a data line through the transistors; a source electrode of the transistor is electrically connected to the data line, a drain electrode of the transistor is electrically connected to the control electrode, and a gate of the transistor is electrically connected to a gate line;

wherein the first substrate further comprises a plurality of connection lines, a gap exists between an orthographic projection of the source electrode of the transistor on the first underlayment and an orthographic projection of the data line on the first underlayment, and the source electrode of the transistor is electrically connected to the data line through the connection lines.

13. The liquid crystal writing board according to claim 1, wherein the first signal line comprises a data line, and the second signal line comprises a gate line.

14. The liquid crystal writing board according to claim 13, wherein the first driver comprises at least one data driver integrated circuit, and the second driver comprises at least one gate driver or a shift register circuit arranged in cascade.

15. The liquid crystal writing board according to claim 6, wherein the first substrate further comprises a third insulation layer disposed between the third conducting layer and the bistable liquid crystal layer;

wherein the second substrate comprises a second underlayment and a fourth conducting layer disposed on the second underlayment, and the second underlayment is a flexible underlayment.

16. The liquid crystal writing board according to claim 1, wherein the number of the first signal lines comprised in the first signal line group ranges from 2 to 8; the number of the second signal lines comprised in the second signal line group ranges from 2 to 8.

17. A method for controlling the liquid crystal writing board according to claim 1, the method comprising:

in response to one of the first signal lines in the first signal line group being disconnected, any one of the first signal lines other than the disconnected first signal line in the first signal line group transmitting an electrical signal to the disconnected first signal line.

* * * * *